United States Patent
Tatara et al.

(10) Patent No.: US 11,850,992 B2
(45) Date of Patent: Dec. 26, 2023

(54) LIGHTING DEVICE

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 839 days.

(21) Appl. No.: 16/492,498

(22) PCT Filed: Mar. 9, 2018

(86) PCT No.: PCT/JP2018/009262
§ 371 (c)(1),
(2) Date: Jan. 4, 2021

(87) PCT Pub. No.: WO2018/164269
PCT Pub. Date: Sep. 13, 2018

(65) Prior Publication Data
US 2021/0114511 A1   Apr. 22, 2021

(30) Foreign Application Priority Data

Mar. 10, 2017  (JP) ................ 2017-045949
Mar. 10, 2017  (JP) ................ 2017-045950

(51) Int. Cl.
*B60Q 1/08*        (2006.01)
*H05B 47/105*      (2020.01)
*G06V 10/141*      (2022.01)
*G06V 20/56*       (2022.01)
*H04N 7/18*        (2006.01)

(52) U.S. Cl.
CPC .......... *B60Q 1/085* (2013.01); *G06V 10/141* (2022.01); *G06V 20/56* (2022.01); *H05B 47/105* (2020.01); *B60Q 2300/054* (2013.01); *H04N 7/18* (2013.01)

(58) Field of Classification Search
CPC .......... B60Q 2300/33; B60Q 2400/00; B60Q 2800/10; B60Q 5/00; B60Q 5/001
See application file for complete search history.

(56) References Cited

U.S. PATENT DOCUMENTS 7,021,791 B1    4/2006  Kobayashi
2005/0275562 A1  12/2005  Watanabe
(Continued)

FOREIGN PATENT DOCUMENTS

DE   102014008100 A1   10/2014
DE   102015200859 A1   7/2016
(Continued)

OTHER PUBLICATIONS

Extended European Search Report issued in European Application No. 18764476.0, dated Nov. 26, 2020 (11 pages).
(Continued)

*Primary Examiner* — Wei (Victor) Y Chan
(74) *Attorney, Agent, or Firm* — Osha Bergman Watanabe & Burton LLP

(57) ABSTRACT

Provided is a lighting device capable of forming an optimal light distribution pattern in a situation in which vehicle travel is being automatically controlled. Provided is a lighting device (100) in which a region having the highest luminous intensity on a virtual projection plane (VP) when the virtual projection plane (VP) is divided into three equal parts from lowest to highest luminous intensity is isolated in the left and right directions by a V line, and at least a portion of the region having the highest luminous intensity is located in a first central portion (M1) of the virtual projection plane (VP).

10 Claims, 15 Drawing Sheets

(56) References Cited

U.S. PATENT DOCUMENTS

| | | | |
|---|---|---|---|
| 2008/0225271 A1* | 9/2008 | Ohmura | B60Q 1/085 |
| | | | 356/51 |
| 2013/0038736 A1 | 2/2013 | Yamamura | |
| 2015/0137680 A1 | 5/2015 | Komatsu et al. | |
| 2015/0258928 A1 | 9/2015 | Goto et al. | |
| 2016/0069527 A1 | 3/2016 | Komatsu et al. | |
| 2016/0368414 A1* | 12/2016 | Son | F21S 41/663 |
| 2017/0159903 A1 | 6/2017 | Yamamura | |
| 2017/0159904 A1 | 6/2017 | Yamamura | |
| 2017/0185855 A1 | 6/2017 | Yamamura | |
| 2018/0056851 A1* | 3/2018 | Kim | G05D 1/0088 |

FOREIGN PATENT DOCUMENTS

| | | |
|---|---|---|
| EP | 2537709 A2 | 12/2012 |
| EP | 2551155 A2 | 1/2013 |
| EP | 3020602 A1 | 5/2016 |
| JP | H04-260106 A | 9/1992 |
| JP | H09-277877 A | 10/1997 |
| JP | H09277887 A | 10/1997 |
| JP | 2000348507 A | 12/2000 |
| JP | 2012-250618 A | 12/2012 |
| JP | 2013-130917 A | 7/2013 |
| JP | 2015-174541 A | 10/2015 |
| WO | 2011-129105 A1 | 10/2011 |

OTHER PUBLICATIONS

Office Action issued in Japanese Application No. 2019-503872; dated Jan. 25, 2022 (12 pages).

International Search Report issued in corresponding Application No. PCT/JP2018/009262, dated Jun. 5, 2018 (5 pages).

Written Opinion issued in corresponding Application No. PCT/JP2018/009262, dated Jun. 5, 2018 (5 pages).

* cited by examiner

LIGHTING DEVICE

TECHNICAL FIELD

The present invention relates to a lighting device.

BACKGROUND ART

Researches on automatic driving techniques of automobiles have been actively conducted in various countries, and each country considers legislation to allow a vehicle to travel on public roads in an automatic driving mode. Here, the automatic driving mode refers to a mode in which the traveling of the vehicle is automatically controlled. On the other hand, a manual driving mode refers to a mode in which the traveling of the vehicle is controlled by a driver. In an automatic driving vehicle, the traveling of the vehicle is automatically controlled by a computer.

Accordingly, it is expected in the future that a vehicle traveling in the automatic driving mode (hereinafter referred to as an "automatic driving vehicle") and a vehicle traveling in the manual driving mode (hereinafter referred to as a "manual driving vehicle") coexist on the public road.

Patent Document 1 discloses an automatic following travel system where a following vehicle automatically follows a preceding vehicle. In the automatic following traveling system, each of the preceding vehicle and the following vehicle includes a display device, and character information for preventing another vehicle from interrupting between the preceding vehicle and the following vehicle is displayed on the display device of the preceding vehicle, and character information indicating that the automatic following traveling is displayed on the display device of the following vehicle.

PRIOR ART DOCUMENT

Patent Document

Patent Document 1: JP-A-H9-277887

SUMMARY OF INVENTION

Problem to be Solved

However, Patent Document 1 does not study a light distribution pattern that is formed forward optimally for automatic driving in a situation in which the traveling of the vehicle is automatically controlled.

An object of the present invention is to provide a lighting device capable of forming an optimal light distribution pattern in a situation in which traveling of a vehicle is automatically controlled.

An object of the present invention is to provide a lighting device that can form an optimal light distribution pattern in a vehicle where the automatic driving mode and the manual driving mode can be switched during the automatic driving mode and the manual driving mode, respectively.

Means for Solving the Problem

A lighting device according to an aspect of the present invention is
a lighting device mounted on a vehicle capable of automatic driving that includes a camera imaging a front of the vehicle, in which
the lighting device can irradiate a light to virtual space that expands in a rectangular shape at 15° each of leftward and rightward and at 6° each of upward and downward with respect to a reference line extending to the front of the vehicle in a horizontal direction from a central position of the lighting device,
when light intensity is equally divided into three from a minimum value to a maximum value, an area having highest light intensity in a virtual projection plane is separated in a left-right direction by a line V extending in a vertical direction through a point on which the reference line is projected,
the virtual projection plane is formed when the virtual space is projected onto a virtual vertical screen installed 25 m in front of the lighting device, and
at least a part of the area having the highest light intensity is located in a first central portion when the virtual projection plane is equally divided into three: the upper portion, the first central portion, and the lower portion in an up-down direction.

A lighting device according to an aspect of the present invention is
a lighting device mounted on a vehicle capable of switching between an automatic driving mode and a manual driving mode, and irradiates light to a front of the vehicle, in which
the lighting device is configured to be able to form a first light distribution pattern during the automatic driving mode and to be able to form a second light distribution pattern during the manual driving mode,
the lighting device can irradiate light to virtual space that expands at 15° each of leftward and rightward and at 6° each of upward and downward with respect to a reference line extending to the front of the vehicle in a horizontal direction from a central position of the lighting device,
in the first light distribution pattern, when the light intensity is equally divided into three from the minimum value to the maximum value, an area having the highest light intensity in a virtual projection plane is separated in the left-right direction by the line V extending in the vertical direction through a point where the reference line is projected,
in the first light distribution pattern, the virtual projection plane is formed when the virtual space is projected onto the virtual vertical screen installed 25 m in front of the lighting device, and
in the first light distribution pattern, at least a part of the area having the highest light intensity is located in a first central portion when the virtual projection plane is equally divided into three: an upper portion, the first central portion, and a lower portion in the up-down direction, and
in the second light distribution pattern, at least a part of the area having the highest light intensity is located in a second central portion when the virtual projection plane is equally divided into three: the upper portion, the second central portion, and the lower portion in the left-right direction.

Effects

According to the present invention, there is provided a lighting device capable of forming an optimal light distribution pattern in a situation in which traveling of a vehicle is automatically controlled.

According to the present invention, there is provided a lighting device that can form an optimal light distribution pattern in a vehicle where the automatic driving mode and the manual driving mode can be switched during the automatic driving mode and the manual driving mode, respectively.

DETAILED DESCRIPTION OF EMBODIMENTS

Figure 1A:
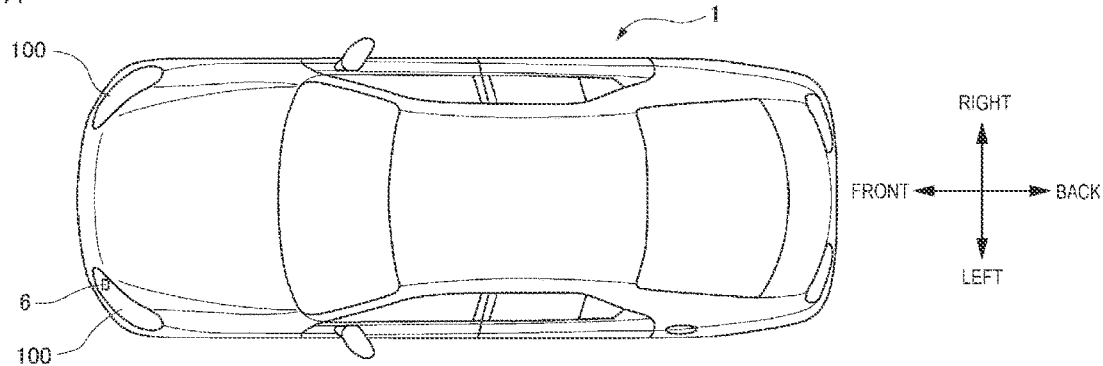
FIG. 1A is a top view of a vehicle including a lighting device according to an embodiment of the present invention.

Hereinafter, an embodiment of the present invention (hereafter, referred to as "the present embodiment") will be described with reference to the drawings. Incidentally, in the description of the present embodiment, members having the same reference numerals as those already described are not described to simplify the description. Dimensions of the members shown in the drawings may be different from those of actual members for convenience of description.

Also, in the description of the present embodiment, for the sake of convenience of description, a "left-right direction", a "front-back direction", and an "up-down direction" will be appropriately mentioned. These directions are relative directions set with respect to a vehicle 1 shown in FIG. 1. The "up-down direction" is a direction including an "up direction" and a "down direction". The "front-back direction" includes a "front direction" and a "back direction". The "left-right direction" is a direction including a "left direction" and a "right direction".

Figure 1B:
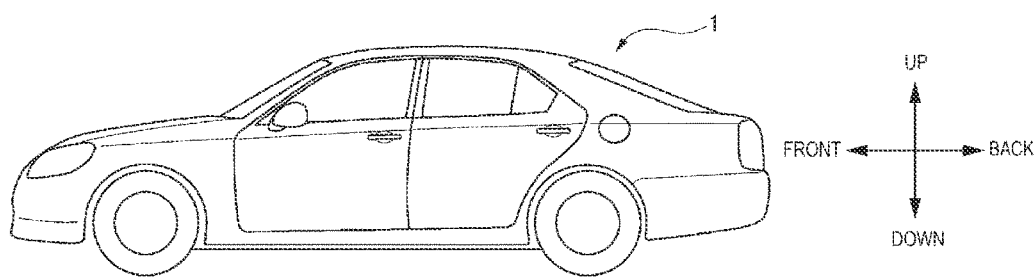
FIG. 1B is a side view of the vehicle shown in FIG. 1A.

FIGS. 1A and 1B show the vehicle 1 mounted with a lighting device 100 according to a first embodiment of the present invention. FIG. 1A shows a top view of the vehicle 1, and FIG. 1B shows a side view of the vehicle 1. The vehicle 1 is an automobile capable of traveling in an automatic driving mode and includes a lighting device 100. In the present embodiment, the lighting device 100 is a headlight provided at a front portion of the vehicle.

Figure 2:
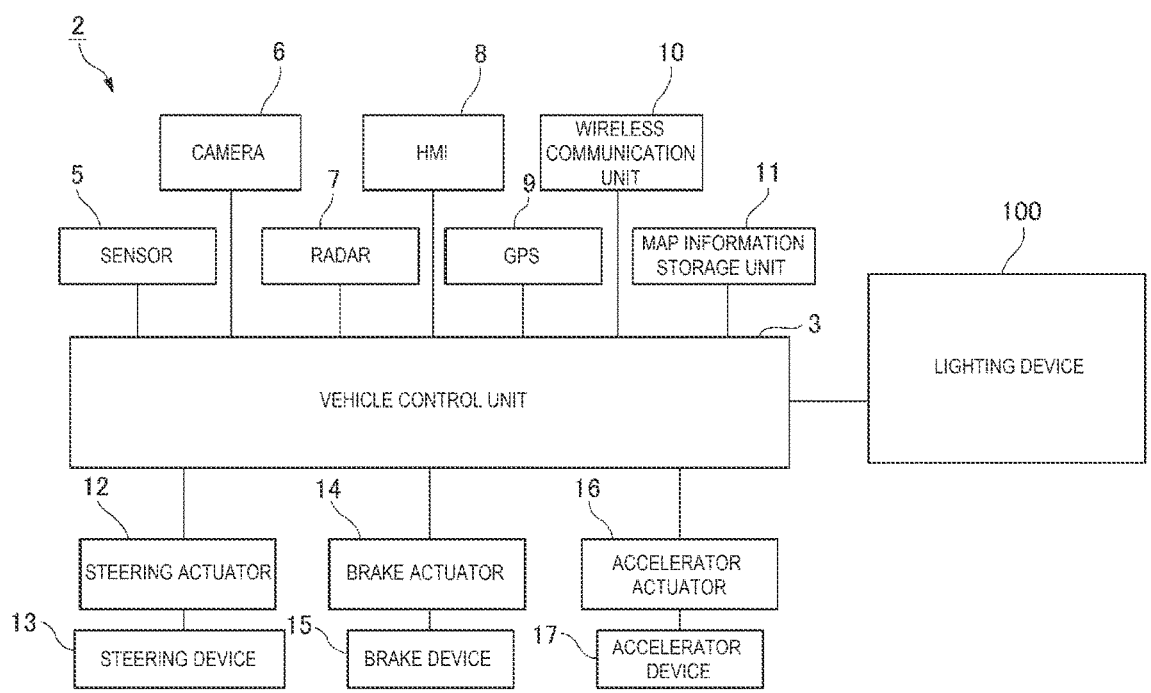
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, a sensor 5, a camera 6, a radar 7, a Human Machine Interface (HMI) 8, a Global Positioning System (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 includes an Electronic Control Unit (ECU). The electronic control unit includes a processor such as a Central Processing Unit (CPU), a Read Only Memory (ROM) storing various vehicle control programs, and a Random Access Memory (RAM) temporarily storing various vehicle control data. The processor develops a program selected from various vehicle control programs stored in the ROM onto the RAM, and executes various processing in cooperation with the RAM. The vehicle control unit 3 is configured to control traveling of the vehicle 1.

The sensor 5 includes an acceleration sensor, a speed sensor, a gyro sensor, or the like. The sensor 5 is configured to detect a traveling state of the vehicle 1 and output traveling state information to the vehicle control unit 3. The sensor 5 may further include a seating sensor which detects whether a driver is sitting on a driver seat, a face orientation sensor which detects a direction of the face of the driver, an outside weather sensor which detects an outside weather condition, and a human sensor which detects whether there is a person in the vehicle. Further, the sensor 5 may include an illuminance sensor which detects illuminance of a surrounding environment of the vehicle 1.

The camera 6 is, for example, a camera including an imaging element such as a Charge-Coupled Device (CCD) or a complementary MOS (CMOS). The camera 6 is a camera which detects visible light or an infrared camera which detects infrared rays. The radar 7 is a millimeter wave radar, a microwave radar, a laser radar, or the like. The camera 6 and the radar 7 are configured to detect the surrounding environment (other vehicles, pedestrians, a road shape, traffic signs, obstacles, or the like) of the vehicle 1 and output surrounding environment information to the vehicle control unit 3.

The HMI 8 includes an input unit which receives input operation from the driver, and an output unit which outputs traveling information or the like to the driver. The input unit includes a steering wheel, an accelerator pedal, a brake pedal, a driving mode changeover switch which switches a driving mode of the vehicle 1, or the like. The output unit is a display which displays various kinds of traveling information.

The GPS 9 is configured to acquire current position information of the vehicle 1 and output the acquired current position information to the vehicle control unit 3. The wireless communication unit 10 is configured to receive traveling information of another vehicle around the vehicle 1 from the other vehicle and transmit the traveling information of the vehicle 1 to the other vehicle (vehicle-to-vehicle communication). The wireless communication unit 10 is configured to receive infrastructure information from infrastructure equipment such as a traffic light and a marker light, and transmit the traveling information of the vehicle 1 to the infrastructure equipment (road-to-vehicle communication). The map information storage unit 11 is an external storage device such as a hard disk drive storing map information and is configured to output the map information to the vehicle control unit 3.

When the vehicle 1 travels in the automatic driving mode, the vehicle control unit 3 automatically generates at least one of a steering control signal, an accelerator control signal, and a brake control signal based on the traveling state information, the surrounding environment information, the current position information, the map information or the like. The steering actuator 12 is configured to receive the steering control signal from the vehicle control device 3 and control the steering device 13 based on the received steering control signal. The brake actuator 14 is configured to receive the brake control signal from the vehicle control device 3 and control the brake device 15 based on the received brake control signal. The accelerator actuator 16 is configured to receive the accelerator control signal from the vehicle control unit 3 and control the accelerator device 17 based on the received accelerator control signal. Accordingly, the traveling of the vehicle 1 is automatically controlled by the vehicle system 2 in the automatic driving mode.

On the other hand, when the vehicle 1 travels in the manual driving mode, the vehicle control unit 3 generates the steering control signal, the accelerator control signal, and the brake control signal according to manual operation of the driver with respect to the accelerator pedal, the brake pedal and the steering wheel. In this way, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automatic driving mode and the manual driving mode. The automatic driving mode includes a fully automatic driving mode, an advanced driving support mode, and a driving support mode. In the fully automatic driving mode, the vehicle system 2 automatically performs all of traveling control including steering control, brake control, and accelerator control, and the driver is not in a state of being capable of driving the vehicle 1. In the advanced driving support mode, the vehicle system 2 automatically performs all of the traveling control including the steering control, the brake control, and the accelerator control, and the driver does not drive the vehicle 1 while the driver is capable of driving the vehicle 1. In the driving support mode, the vehicle system 2 automatically performs some of the traveling control including the steering control, the brake control, and the accelerator control, and the driver drives the vehicle 1 under the driving support of the vehicle system 2. Meanwhile, in the manual driving mode, the vehicle system 2 does not automatically perform the traveling control, and the driver drives the vehicle 1 without the driving support of the vehicle system 2.

The driving mode of the vehicle 1 may be switched by operating the driving mode changeover switch. In this case, the vehicle control unit 3 switches the driving mode of the vehicle 1 among the four driving modes (the fully automatic driving mode, the advanced driving support mode, the driving support mode, and the manual driving mode) according to the operation of the driver to the driving mode changeover switch. The driving mode of the vehicle 1 may be automatically switched on the basis of information about a travel-permitted section in which an automatic driving vehicle can travel, information about a travel-prohibited section in which traveling of the automatic driving vehicle is prohibited, or information about the outside weather condition. In this case, the vehicle control unit 3 switches the driving mode of the vehicle 1 based on these kinds of information. Further, the driving mode of the vehicle 1 may be automatically switched by using the seating sensor, the face orientation sensor, or the like. In this case, the vehicle control unit 3 switches the driving mode of the vehicle 1 based on an output signal from the seating sensor or the face orientation sensor.

Figure 3:
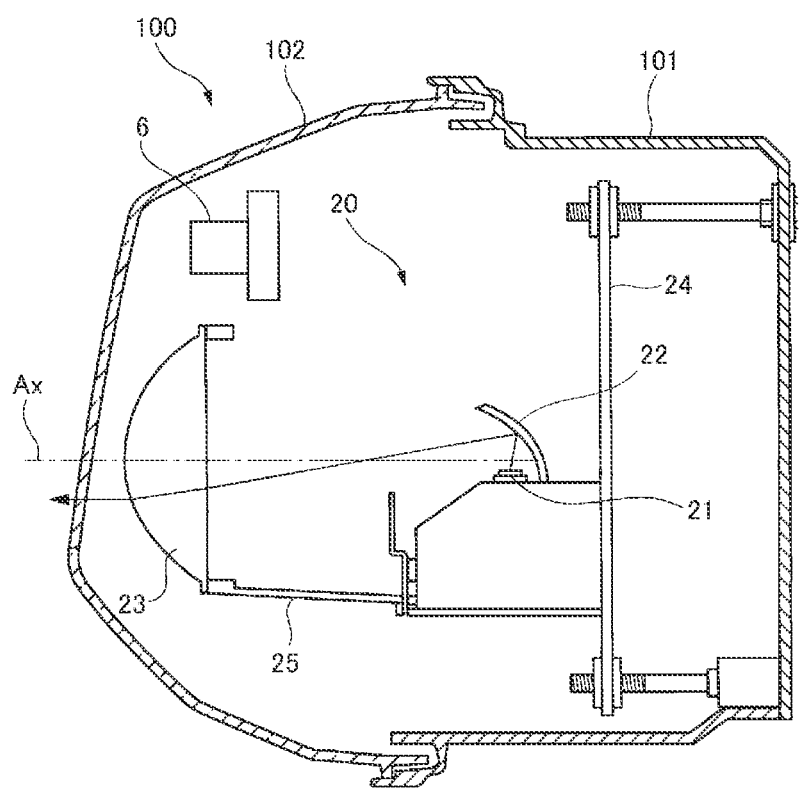
FIG. 3 is a cross-sectional view of the lighting device according to an embodiment of the present invention.

Next, the lighting device 100 will be described in detail with reference to FIG. 3. FIG. 3 is a cross-sectional view of the lighting device 100.

As shown in FIG. 3, the lighting device 100 includes a housing 101 having an opening in the front, and an outer cover 102 that closes the opening and forms a lamp chamber S together with the housing 101. A light source unit 20 that emits light in a direction of an optical axis Ax extending in the front-back direction of the lamp is provided inside the lamp chamber S. The light source unit 20 includes a light source 21 such as an LED, a reflector 22 which reflects the light emitted from the light source 21 toward the front of the lamp, and a projection lens 23 provided in front of the reflector 22.

The projection lens 23 emits the light emitted from the light source 21 and reflected by the reflector 22 toward the front of the lamp. The light source 21 and the reflector 22 are mounted on a base portion 24. The projection lens 23 is fixed to a lens holder 25 fixed to the base portion 24. The base portion 24 is supported by the housing 101.

Figure 4:
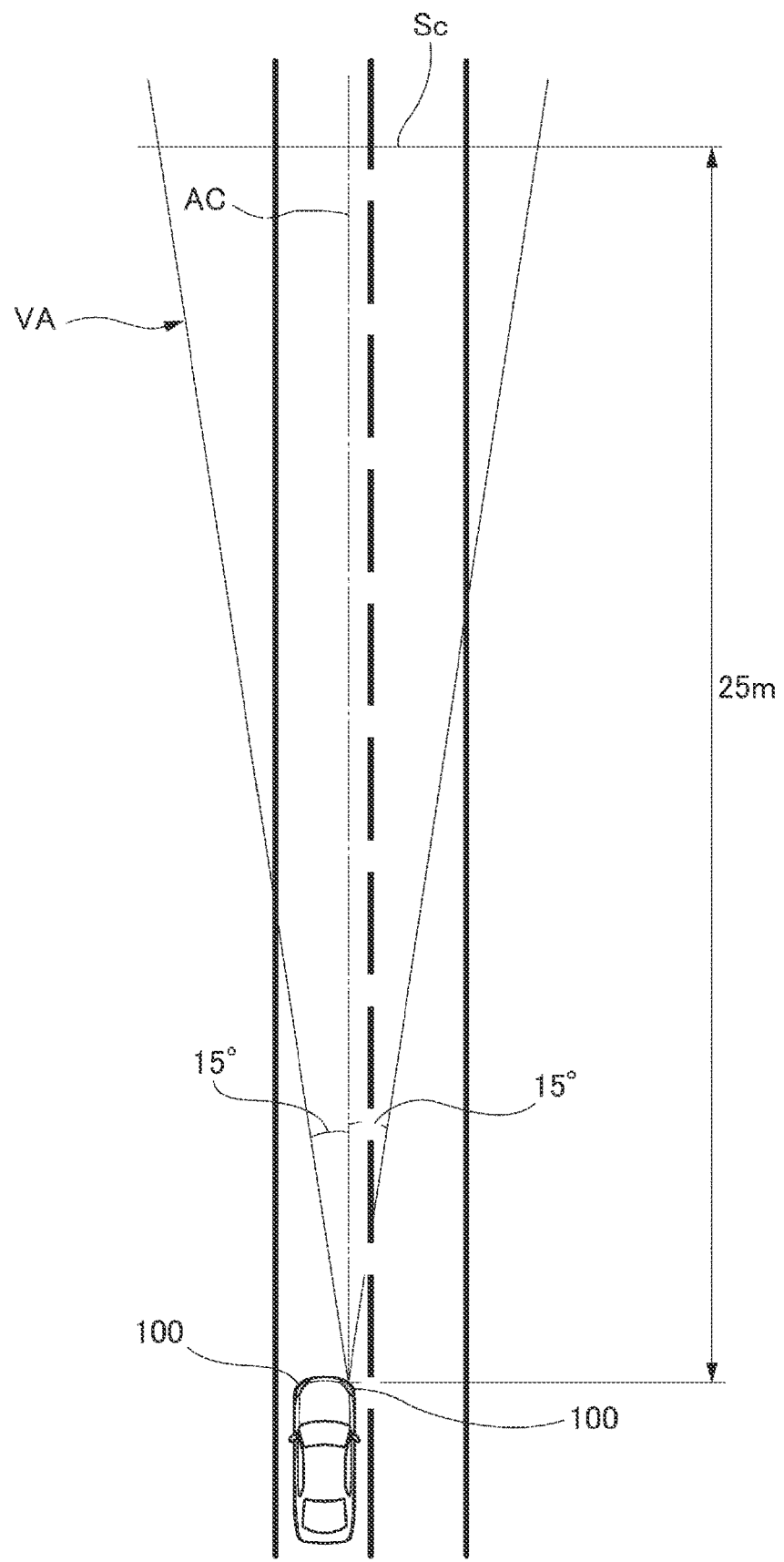
FIG. 4 shows virtual space when the vehicle is viewed from above.
Figure 5:
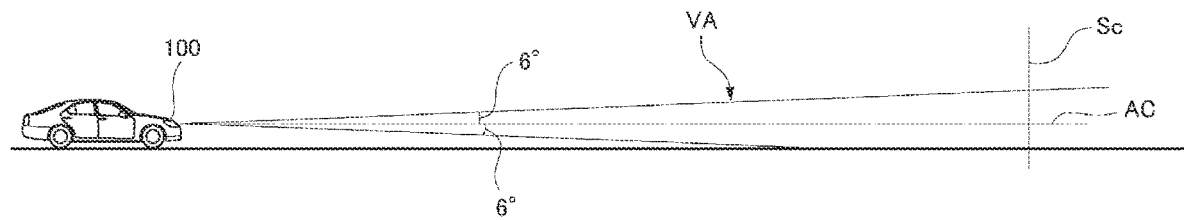
FIG. 5 shows virtual space when the vehicle is viewed from the right.

FIG. 4 shows a state in which the vehicle 1 is viewed from above. FIG. 5 shows a state in which the vehicle 1 is viewed from right. As shown in FIG. 4, a virtual straight line extending in a horizontal direction to the front of the vehicle 1 from a central position in the left-right direction and the up-down direction of a front surface of the lighting device 100 mounted on a right front portion of the vehicle 1 is defined as a reference line AC. As shown in FIG. 4, virtual space VA is a triangular area expanding in the left-right direction toward the front of the vehicle 1 on the basis of a reference line AC when viewed from above the vehicle 1. As shown in FIG. 5, virtual space VA is a triangular area expanding in the up-down direction toward the front of the vehicle 1 on the basis of a reference line AC when viewed from a lateral side of the vehicle 1.

As shown in FIG. 4 and FIG. 5, the light source unit 20 is configured to be able to irradiate with light the virtual space VA expanding in a rectangular shape at least 15° leftward and rightward and 6° upward and downward with respect to the reference line AC extending in the horizontal direction from the center of the lighting device 100 to the front of the vehicle 1. The light source unit 20 may be configured to irradiate the outside of the virtual space VA with light.

Although not shown, the virtual space VA is defined which expands forward in a rectangular shape from the reference line AC extending forward from the lighting device 100 mounted on a left front portion of the vehicle 1, and similarly, from a center point of the lighting device 100 mounted on the left front portion of the vehicle 1.

Figure 6:
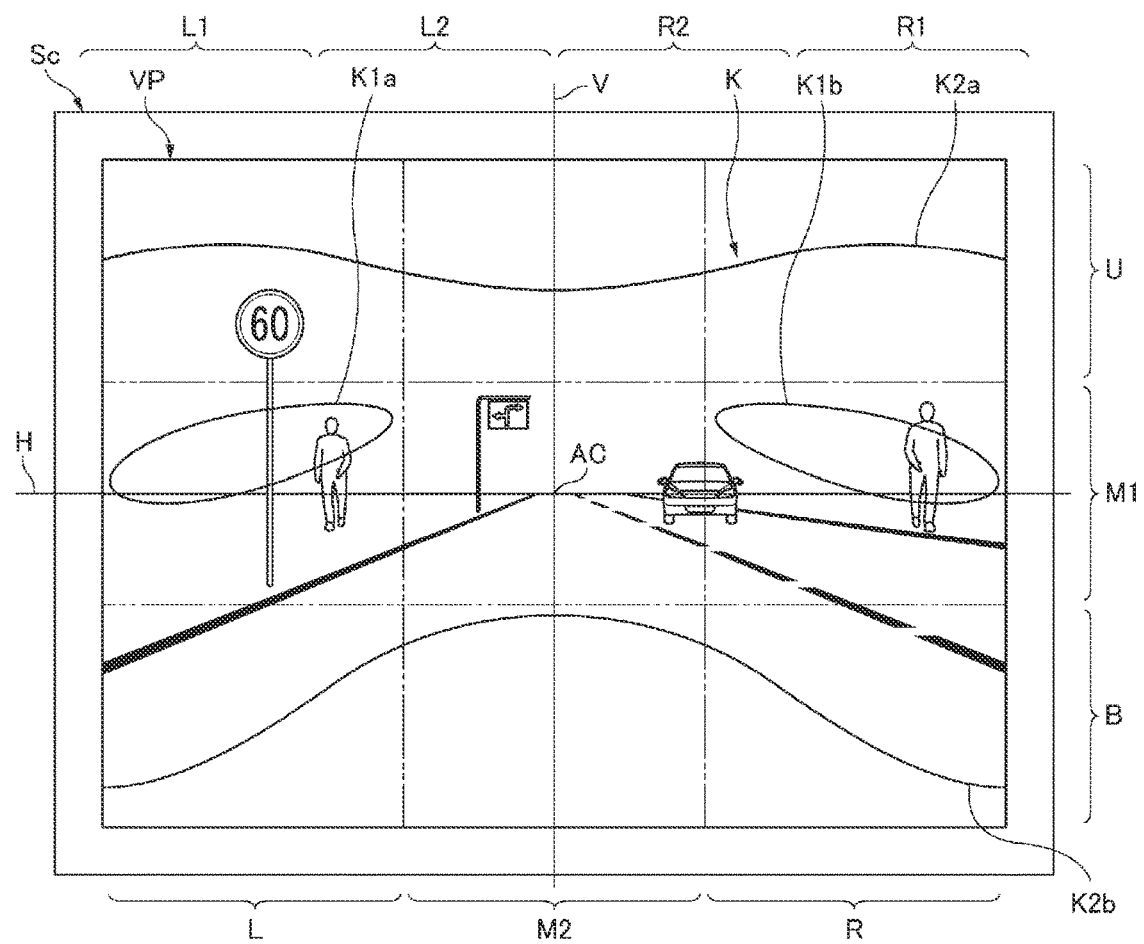
FIG. 6 is a diagram showing a state in front of the vehicle.

FIG. 6 is a diagram showing a state in front of the vehicle 1. FIG. 6 shows a virtual vertical screen Sc provided at 25 m in front of the lighting device 100 mounted on the right front portion of the vehicle 1. The lighting device 100 mounted on the right front portion of the vehicle 1 irradiate with light the virtual space VA that expands in a rectangular shape from the central position of the front surface of the lighting device 100 mounted on the right front portion of the vehicle 1. When the virtual space VA is projected onto the virtual vertical screen Sc, a virtual projection plane VP is formed on the virtual vertical screen Sc.

A line V and a line H are shown in FIG. 6. The line V is a straight line extending in a vertical direction through the reference line AC extending in the horizontal direction from the central position of the lighting device 100 mounted on the right front portion of the vehicle 1 to the front of the vehicle 1. The line H is a straight line extending in a horizontal direction through the reference line AC extending in the horizontal direction from the central position of the lighting device 100 mounted on the right front portion of the vehicle 1 to the front of the vehicle 1.

As shown in FIG. 6, an upper edge of the virtual projection plane VP is located 6° above the line H and extends in the horizontal direction. A lower edge of the virtual projection plane VP is located 6° above the line H and extends in the horizontal direction. A right edge of the virtual projection plane VP is located 15° to the right of the line V and extends in the vertical direction. A left edge of the virtual projection plane VP is located 15° to the left of the line V and extends in the vertical direction.

The light source unit 20 of the lighting device 100 is configured to be able to irradiate at least the virtual projection plane VP shown in FIG. 6 with light. The light source unit 20 is configured to be able to form a light distribution pattern by irradiating a part or the whole of the frame with light.

In FIG. 6, in the following description, the virtual projection plane VP is equally divided into three: an upper portion U, a first central portion M1, and a lower portion B in the up-down direction. The virtual projection plane VP is equally divided into three in the left-right direction: a left portion L, a second central portion M2, and a right portion R.

That is, the first central portion M1 is an area expanding forward at an angle of 2° vertically from the reference line AC. The upper portion U is an area expanding forward at an angle of 2° to 6° above the reference line AC. The lower portion B is an area expanding forward at an angle of 2° to 6° below the reference line AC. The second central portion M2 is an area expanding forward at an angle of 10° horizontally from the reference line AC. The left portion L is an area expanding forward at an angle of 10° to 30° to the left of the reference line AC. The right portion R is an area expanding forward at an angle of 10° to 30° to the right of the reference line AC.

In the following description, nine divided areas in the virtual projection plane VP may be called by combinations of symbols U, M1, B, L, M2, and R. For example, an upper right area may be called an area UR, and a lower central area may be called an area M1B.

The lighting device 100 forms a glasses-type light distribution pattern K as shown in FIG. 6. In FIG. 6, the light distribution pattern K is shown using contour lines of light intensity. In FIG. 6, the contour lines are shown by equally dividing the light intensity in the virtual projection plane VP into three from the minimum value to the maximum value.

For example, in a case where the minimum value is 50,000 candelas and the maximum value is 110,000 candelas in the virtual projection plane VP, an area having the lowest light intensity is an area irradiated with 50,000 to 70,000 candelas, an area having middle light intensity is an area irradiated with 70,000 to 90,000 candelas, and an area having the highest light intensity is an area irradiated with 90,000 to 110,000 candelas. The light intensity is merely an example, and the present invention is not limited to the light intensity.

In the virtual projection plane VP, an inner area surrounded by a line K1a and an inner area surrounded by a line K1b are areas having the highest light intensity. An area above the line K2a and an area below the line K2b are areas having the lowest light intensity. An area surrounded by the line K1a and the line K1b, the line K2a, and the line K2b is the area having middle light intensity.

As shown in FIG. 6, in the virtual projection plane VP, when the light intensity is equally divided into three from the minimum value to the maximum value, an area having the highest light intensity is separated in the left-right direction by a line V extending in the vertical direction through a point where the reference line AC is projected. At least a part of the area having the highest light intensity is located in a first central portion M1 when the virtual projection plane is equally divided into three: the upper portion U, the first central portion M1, and the lower portion B in the up-down direction. In the illustrated example, the area having the highest light intensity is divided into two by the line V in the left-right direction.

However, it is difficult for a camera to recognize a bright object and a dark object at the same time as compared with human eyes. When the bright object is imaged, sensitivity of the camera is set low, or exposure time is set short. When the dark object is imaged, the sensitivity of the camera is set high, or the exposure time is set long. As described above, when the bright object is imaged and the dark object is imaged, the settings of an optimal camera are different. Therefore, it is difficult for the camera to recognize a bright object and a dark object at the same time as compared with human eyes.

During the automatic driving, it is necessary to acquire information such as a state of a road surface in front of the vehicle, presence or absence of a pedestrian walking on a road shoulder on a side of a driver's seat, information on a sign provided on the head of the driver, and presence or absence of a preceding vehicle or a facing vehicle located in front of the vehicle.

During the automatic driving, it is assumed that these pieces of information are acquired by a camera. However, since an amount of light the camera receives from the object varies, halation occurs when the amount of light from the object is large, and the sensitivity is insufficient when the amount of light from the object is small.

Specifically, when the sensitivity of the camera is lowered or exposure time is shortened so that halation does not occur on a specific bright object, sensitivity to other dark objects is insufficient. On the other hand, when the sensitivity of the camera is raised or the exposure time is increased so as to compensate for insufficient sensitivity to a specific dark object, halation occurs on other bright objects.

In this way, it is difficult to prevent the occurrence of halation and insufficiency of sensitivity only by the camera. Therefore, the present inventor has studied a light distribution pattern suitable for automatic driving instead of uniformly irradiating the front of the vehicle with light. The present inventor has studied brightness of light from an object necessary for acquiring information.

Among the objects described above, bright reflected light is obtained when the objects are irradiated with light since the sign is coated with a paint having high reflectivity. Since the road surface in front of the vehicle is located near a headlight of a host vehicle, bright light is reflected. Therefore, when information on these signs and information on the road surface in front of the vehicle are acquired by the camera, bright light is incident on the camera.

On the other hand, since a pedestrian is hard to reflect light as compared with a sign or the like, dark light is incident on the camera when information of the pedestrian is to be acquired with the camera.

In order to accurately acquire information such as a sign or a road surface, when conditions such as exposure time and sensitivity of the camera suitable for brightness of light incident therefrom are set, the sensitivity to light from the pedestrian is easy to be insufficient. On the other hand, when conditions of the camera suitable for brightness of light incident from the pedestrian are set in order to accurately acquire information from the pedestrian, halation is easy to occur with light incident from the sign, the road surface, or the like. In this way, when light having uniform brightness is projected forward, a difference in brightness of reflected light is large, and it is difficult to obtain accurate information by the camera.

Therefore, the present inventor has studied in which area of the virtual projection plane VP of the virtual vertical screen the objects are easy to appear.

As shown in FIG. 6, the sign obtaining bright reflected light appears from the upper portion U to the first central portion M1 in the up-down direction and in the second central portion M2 in the left-right direction. The road surface in front of the vehicle obtaining bright reflected light appears from the first central portion M1 to the lower portion B in the up-down direction and in the second central portion M2 in the left-right direction. That is, the object obtaining bright reflected light appears from the upper portion U to the lower portion B in the up-down direction and in the second central portion M2 in the left-right direction.

The pedestrian having dark reflected light appears from the first central portion M1 to the lower portion B in the up-down direction and in areas of the left portion L and the right portion R and in the left-right direction.

In this way, the present inventor has found that an area in which the sign or the road surface obtaining bright reflected light appears is different from an area in which the pedestrian having dark reflected light appears.

Therefore, the lighting device 100 according to the present embodiment is irradiated with light so that an area having the highest light intensity is separated by the line V in the left-right direction, and at least a part of the area having the highest light intensity is located in the first central portion M1 in the up-down direction. Therefore, the pedestrian can be irradiated with bright light, and relatively bright reflected light is obtained from the pedestrian. On the other hand, since the sign or the road surface is irradiated with relatively dark light, the reflected light is also relatively dark. As a result, dispersion in the brightness of the reflected light from the object acquired by the camera can be reduced. Accordingly, occurrence of halation in the camera or occurrence of insufficient sensitivity can be prevented, and a light distribution pattern suitable for an automatic driving vehicle is obtained.

In the above description, the lighting device 100 mounted on the right front portion of the vehicle has been described, but the lighting device 100 mounted on the left front portion of the vehicle may also be configured similarly such that in the virtual projection plane VP, when the light intensity is equally divided into three between the minimum value and the maximum value, the area having the highest light intensity is separated by the line V in the left-right direction, and at least a part of the area having the highest light intensity is located in the first central portion M1.

In the lighting device according to the present embodiment, as shown in FIG. 6, when the virtual projection plane VP is divided equally in the left-right direction into three: the left portion L, the second central portion M2, and the right portion R, at least parts of the two areas having the highest light intensity are located on the left portion L and right portion R, respectively.

It is highly possible that the pedestrians close to the host vehicle in the front-back direction is in the left portion L and the right portion R of the virtual projection plane VP. Therefore, according to the lighting device 100 of the present embodiment, since the left portion L and the right portion R where the pedestrians are highly possible to be present are irradiated with bright light, the pedestrians are easily recognized by the camera.

As shown in FIG. 6, in the present embodiment, when the virtual projection plane VP are equally divided in the left-right direction into four: L1, L2, R2, and R1 from left in order, at least parts of the two areas having the highest light intensity are located in a left end area L1 and a right end area R1, respectively.

According to the lighting device 100 according to the present embodiment, the left end area L1 and the right end area R1 are irradiated with bright light. As described above, it is possible that the pedestrians close to the host vehicle are present in the left end and right end areas L1 and R1 on the virtual projection plane VP. Therefore, according to the lighting device 100 of the present embodiment, the pedestrians can be irradiated with bright light, and it is easy for the camera to recognize the pedestrians close to the host vehicle.

In addition, when the host vehicle travels on a left lane as in Japan, it is preferable that a point having the highest light intensity in the area having the highest light intensity located on the left of the line V is located in an area of 1 degree or more and 4 degrees or less to the left of the line V. Accordingly, a pedestrian located on a left side (a side close to the host vehicle) of the host vehicle and 30 m to 80 m in front of the host vehicle is irradiated with bright light. In a case where the host vehicle travels on a right lane as in the United States, it is preferable that a point having the highest light intensity in the area having the highest light intensity located on the right of the line V is located in an area of 1 degree or more and 4 degrees or less to the right of the line V.

Similarly, in the case where the host vehicle travels on the left lane as in Japan, it is preferable that a point having the highest light intensity in the area having the highest light intensity located on the right of the line V is located in an area of 4 degree or more and 12 degrees or less to the right of the line V. Accordingly, a pedestrian located on a right side (a side far from the host vehicle) of the host vehicle and 30 m to 80 m in front of the host vehicle is irradiated with bright light. In the case where the host vehicle travels on the right lane as in the United States, it is preferable that a point having the highest light intensity in the area having the highest light intensity located on the left of the line V is located in an area of 4 degree or more and 12 degrees or less to the left of the line V.

As shown in FIG. 6, in the present embodiment, the two areas having the highest light intensity are formed in a band shape extending in the left-right direction. When the vehicle 1 advances, the pedestrian located near the center of the virtual projection plane VP appears to move leftward or rightward therefrom. Since the areas having the highest light intensity are formed in a band shape extending in the left-right direction, it is possible to continue irradiating the pedestrians continuously with bright light even if the vehicle 1 advances. This makes it easy for the camera to recognize the pedestrians.

As shown in FIG. 6, in the present embodiment, the two areas having the highest light intensity have a diagonally right down shape from the center toward the right, and a diagonally left down shape from the center toward the left, respectively. As shown in FIG. 6, the road shoulder located on the left side of the host vehicle extends from the center of the virtual projection plane VP toward the lower left, and the road shoulder located on the right side of the host vehicle extends from the center to the lower right of the virtual projection plane VP. Since the pedestrians proceed along the road shoulder, it is possible to continue irradiating the pedestrians with bright light even if the pedestrians move. This makes it easy for the camera to recognize the pedestrians.

Figure 7:
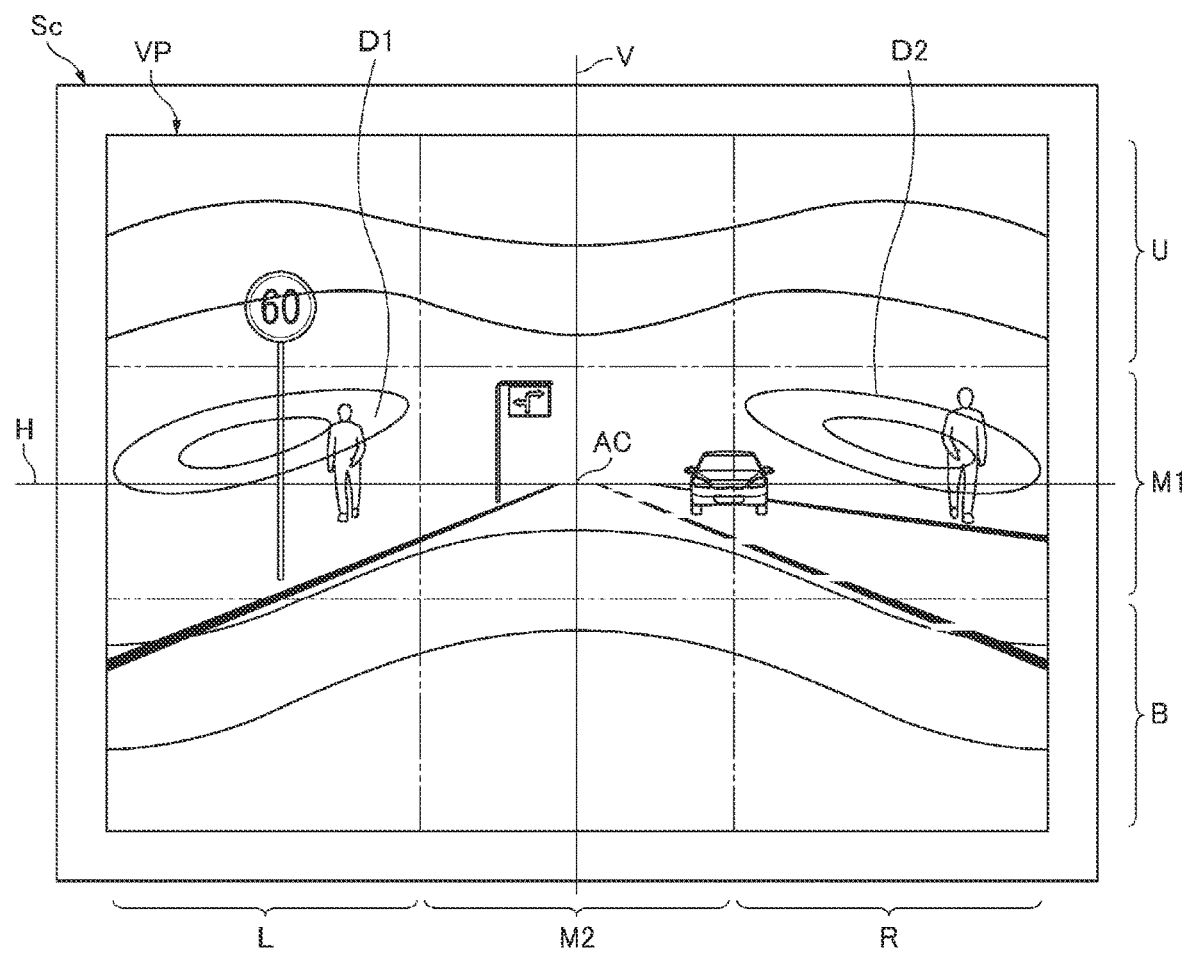
FIG. 7 is a diagram showing a state in front of the vehicle.

In the present embodiment described above, a case when the light intensity is equally divided into three from the minimum value to the maximum value in the virtual projection plane VP is studied, but as shown in FIG. 7, the light intensity may be divided into five levels between the minimum value and the maximum value.

As shown in FIG. 7, an area having the highest light intensity in the virtual projection plane VP formed when the virtual space VA is projected onto the virtual vertical screen Sc installed 25 m in front of the lighting device is separated in the left-right direction by the line V extending in the vertical direction through a point where the reference line AC is projected when the light intensity is equally divided into five from the minimum value to the maximum value, and at least a part of the area having the highest light intensity may be located in the first central portion when the virtual projection plane VP is equally divided in the up-down direction into three: the upper portion U, the first central portion M1, and the lower portion B.

In FIG. 7, the area having the highest light intensity is the inside of an area surrounded by a line D1 and the inside of an area surrounded by a line D2. Since a pedestrian appears in the area having the highest light intensity, relatively bright reflected light is obtained from the pedestrian, and accurate information is obtained by a camera.

Second Embodiment

Figure 8A:
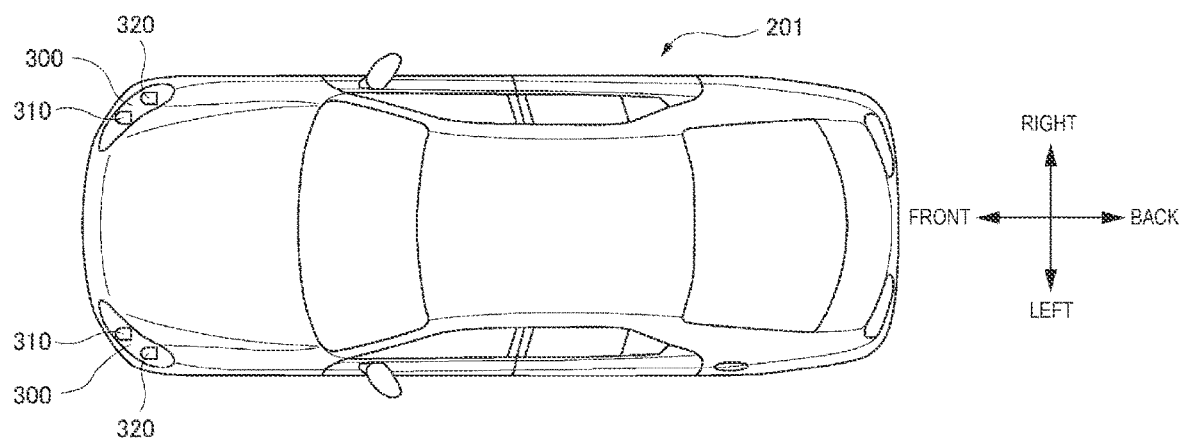
FIG. 8A is a top view of a vehicle including a lighting device according to a first embodiment of the present invention.
Figure 8B:
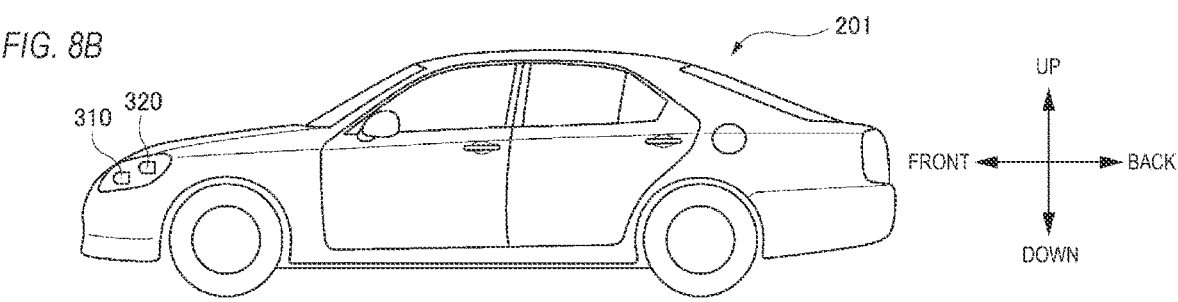
FIG. 8B is a side view of the vehicle shown in FIG. 8A.

FIGS. 8A and 8B show a vehicle 201 mounted with a lighting device 300 according to a second embodiment of the present invention. FIG. 8A shows a top view of the vehicle 201, and FIG. 8B shows a side view of the vehicle 201. The vehicle 201 is an automobile capable of traveling in an automatic driving mode and includes the lighting device 300. In the present embodiment, the lighting device 300 is a headlight provided at a front portion of the vehicle 201.

Figure 9:
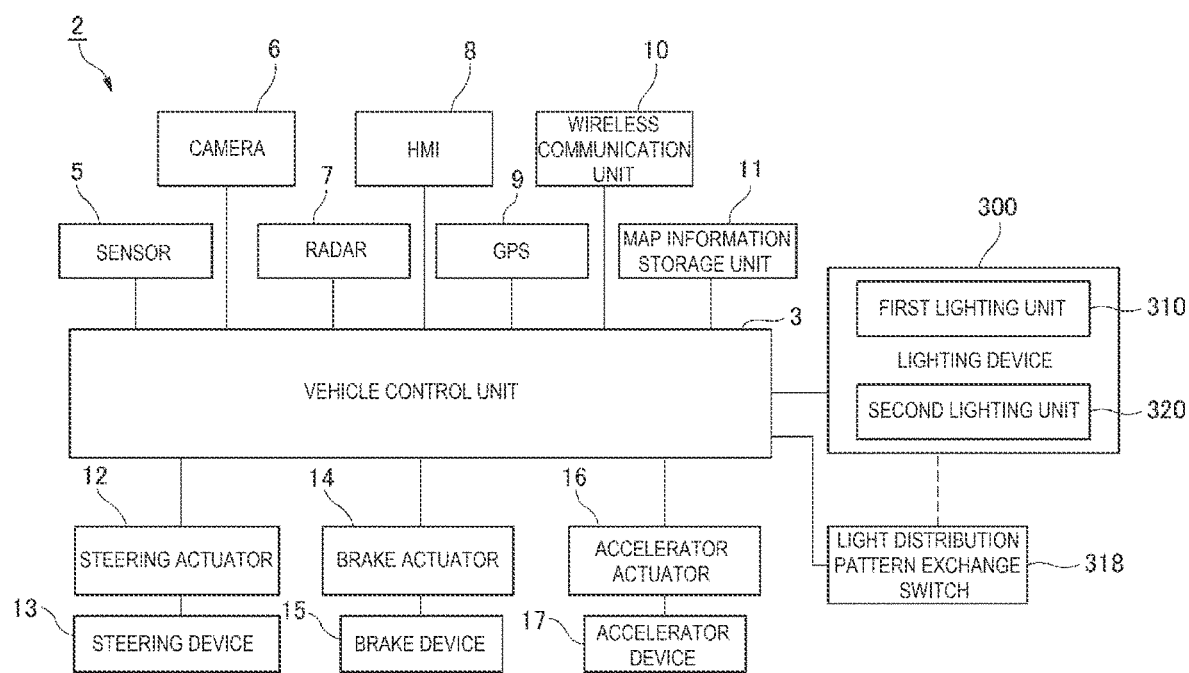
FIG. 9 is a block diagram of a vehicle system according to the first embodiment of the present invention.

FIG. 9 is a block diagram of a vehicle system according to the second embodiment of the present invention. The same components as those in the block diagram of the vehicle system shown in FIG. 2 are denoted by the same reference numerals, and descriptions thereof are omitted. As shown in FIGS. 8A and 8B, in the vehicle system according to the present embodiment, the lighting device 300 including a first lighting unit 310 and a second lighting unit 320, and a light distribution pattern changeover switch 318 are connected to the vehicle control unit 3.

Next, the lighting device 300 will be described in detail. As shown in FIG. 8A, 8B and FIG. 9, the lighting device 300 includes the first lighting unit 310 and the second lighting unit 320. As shown in FIG. 8A, the first lighting unit 310 of the lighting device 300 mounted on a right front portion of the vehicle 201 is provided on the left of the second lighting unit 320. The first lighting unit 310 of the lighting device 300 mounted on a left front portion of the vehicle 201 is provided on the right of the second lighting unit 320.

Figure 10:
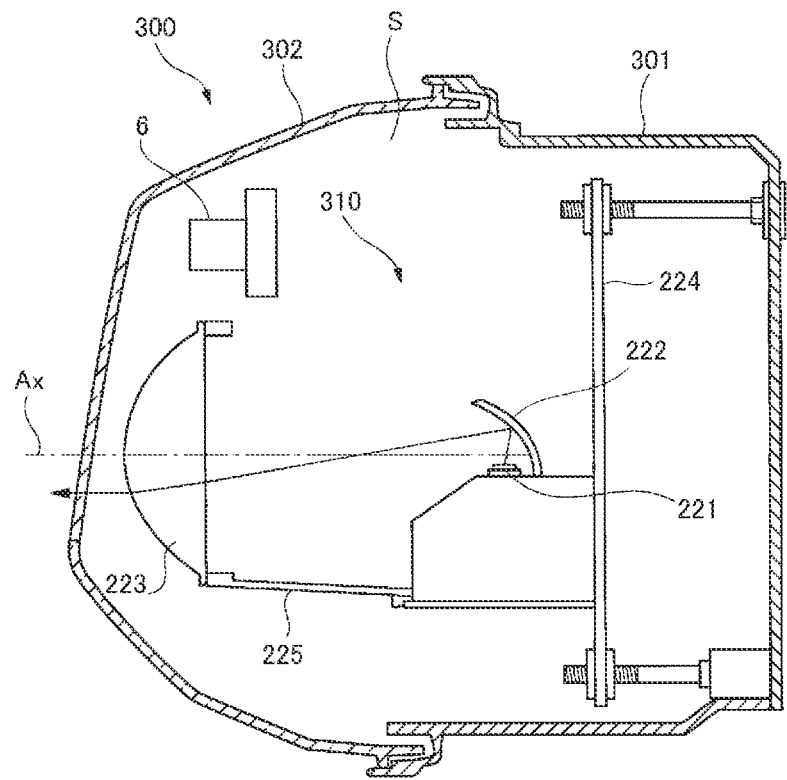
FIG. 10 is a cross-sectional view of the lighting device showing a first lighting unit.

First, the first lighting unit 310 will be described. FIG. 10 is a cross-sectional view of the lighting device 300 showing the first lighting unit 310. The first lighting unit 310 can form a first light distribution pattern P to be described later.

As shown in FIG. 10, the lighting device 300 includes a housing 301 having an opening in the front, and an outer cover 302 which closes the opening and forms a lamp chamber together with the housing 301. The first lighting unit 310 which emits light in a direction of an optical axis Ax extending in the front-rear direction of a lamp is provided inside the lamp chamber. The first lighting unit 310 includes a light source 421 such as an LED, a reflector 222 which reflects light emitted from the light source 421 toward the front of the lamp, and a projection lens 223 provided in front of the reflector 222.

The projection lens 223 emits the light emitted from the light source 421 and reflected by the reflector 222 toward the front of the lamp. The light source 421 and the reflector 222 are mounted on a base portion 224. The projection lens 223 is fixed to a lens holder 225 fixed to the base portion 224. The base portion 224 is supported by the housing 301.

Figure 11:
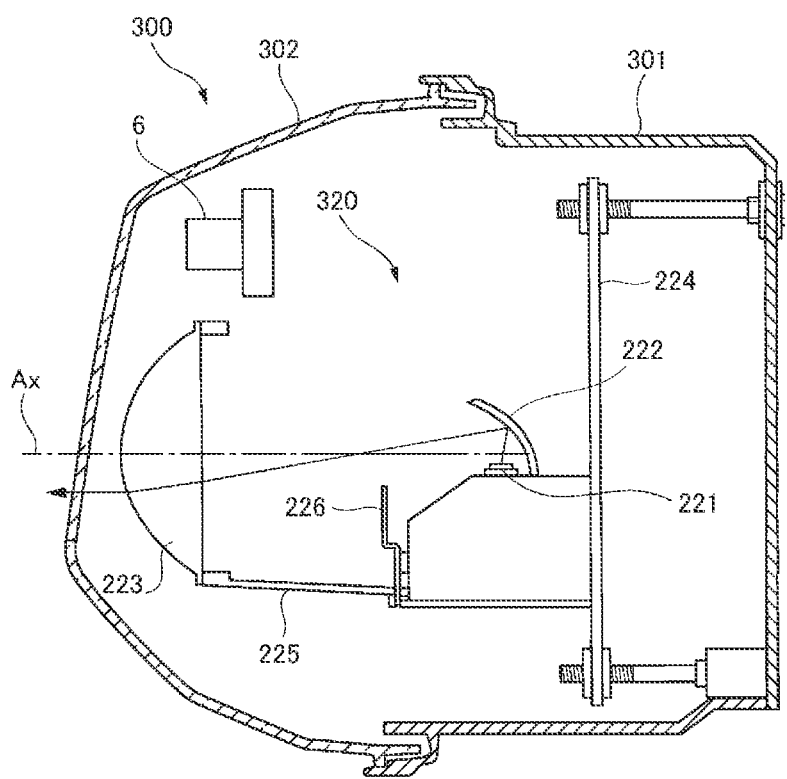
FIG. 11 is a cross-sectional view of the lighting device showing a first lighting unit.

FIG. 11 is a cross-sectional view of the lighting device 300 showing the first lighting unit 320. The second lighting unit 320 can form a second light distribution pattern Q and a third light distribution pattern S to be described later. The second lighting unit 320 is different from the first lighting unit 310 in that a shade 226 for forming a cutoff line CL of the second light distribution pattern Q to be described later is included. In addition, since the second lighting unit 320 has substantially the same configuration as that of the first lighting unit 310, a detailed description thereof is omitted.

The shade 226 is movable between a position blocking a part of light incident on the projection lens 223 and a position not blocking the light incident on the projection lens 223 by a shade driving mechanism (not shown).

When the shade 226 is positioned at a position blocking a part of the light incident on the projection lens 223, the second lighting unit 320 irradiates the front of the lighting device 300 with the second light distribution pattern Q.

When the shade 226 is positioned at a position not blocking a part of the light incident on the projection lens 223, the second lighting unit 320 irradiates the front of the lighting device 300 with the third light distribution pattern S.

Irradiation of the first light distribution pattern P by the first lighting unit 310, the irradiation of the second light distribution pattern Q by the second lighting unit 320, and the irradiation of the third light distribution pattern S by the second lighting unit 320 can be switched by a light distribution pattern changeover switch 218 shown in FIG. 9.

A driver operates the light distribution pattern changeover switch 218, so that (1) A state in which the first lighting unit 310 is turned on and the second lighting unit 320 is turned off, and irradiation is performed with the first light distribution pattern P, (2) a state in which the first lighting unit 310 is turned off and the second lighting unit 320 is turned on, and irradiation is performed with the second light distribution pattern Q, (3) a state in which the first lighting unit 310 is turned off and the second lighting unit 320 is turned on, and irradiation is performed with the third light distribution pattern S, (4) a state in which the first lighting unit 310 and the second lighting unit 320 are turned on, or a state in which the first lighting unit 310 is turned on and the second lighting unit 320 is dimmed (a state in which light irradiated by the second lighting unit 320 is darker than light irradiated by the first lighting unit 310 as a whole), and (5) a state in which the first lighting unit 310 and the second lighting unit 320 are turned off can be switched.

As indicated by solid lines in FIG. 9, output of the light distribution pattern changeover switch 218 may be configured to be input to the vehicle control unit 3. Alternatively, as indicated by a broken line in FIG. 9, the output of the light distribution pattern changeover switch 218 may be input to the lighting device 300.

Next, the first light distribution pattern P, the second light distribution pattern Q, and the third light distribution pattern S formed by the lighting device 300 will be described using FIG. 12 to FIG. 14. As in the first embodiment described before, the lighting device 300 is configured to be able to irradiate at least the virtual space VA shown in FIG. 4 and FIG. 5 with light.

Figure 12:
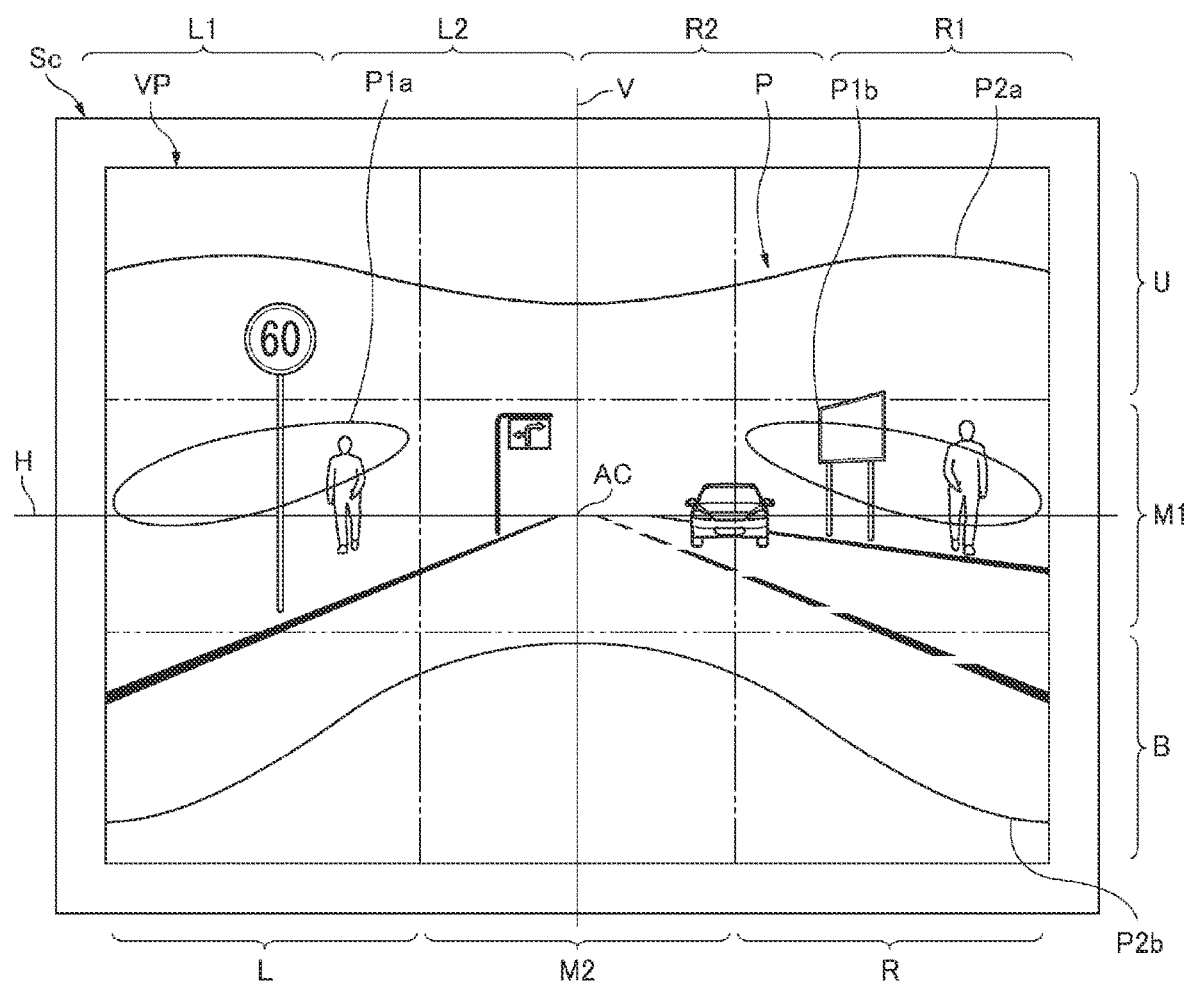
FIG. 12 shows a first light distribution pattern.
Figure 13:
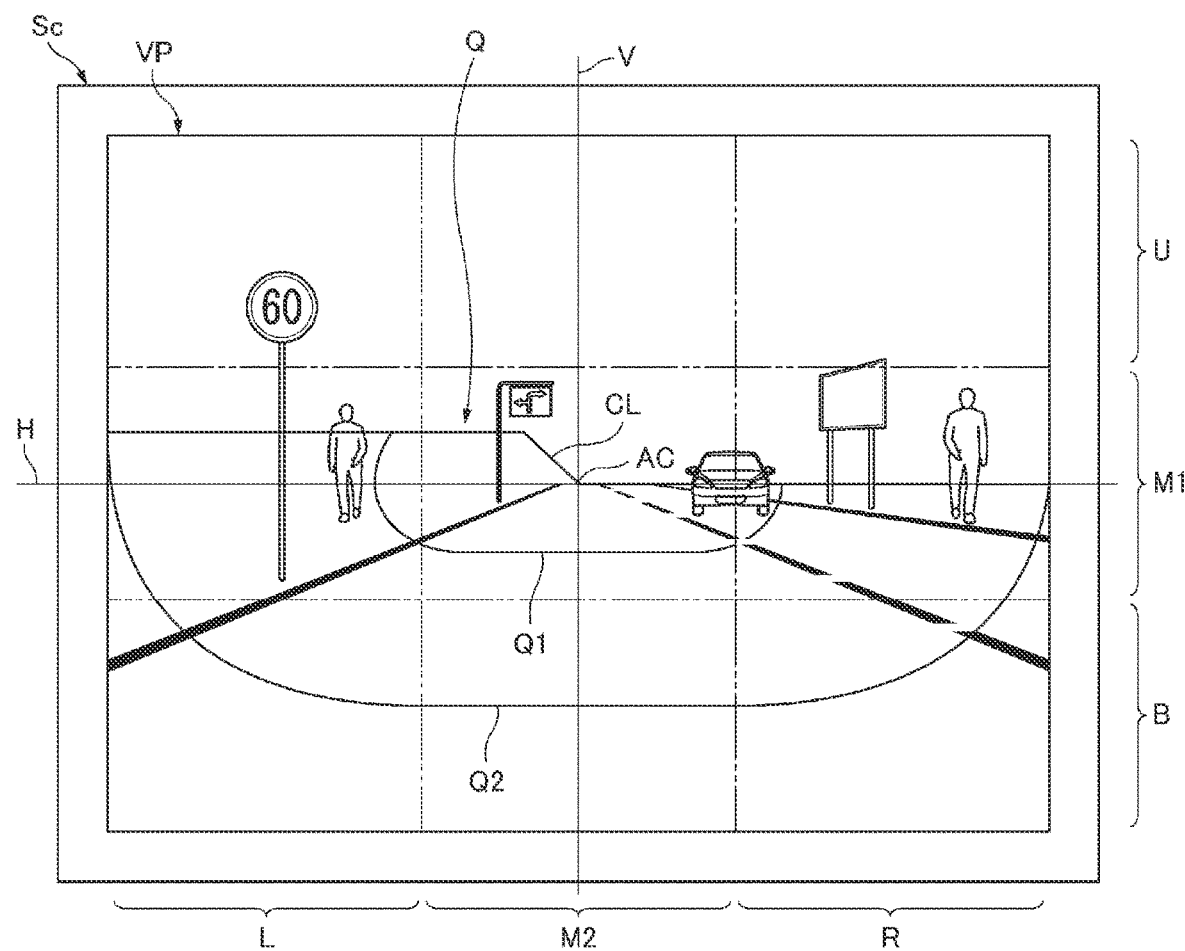
FIG. 13 shows a second light distribution pattern.
Figure 14:
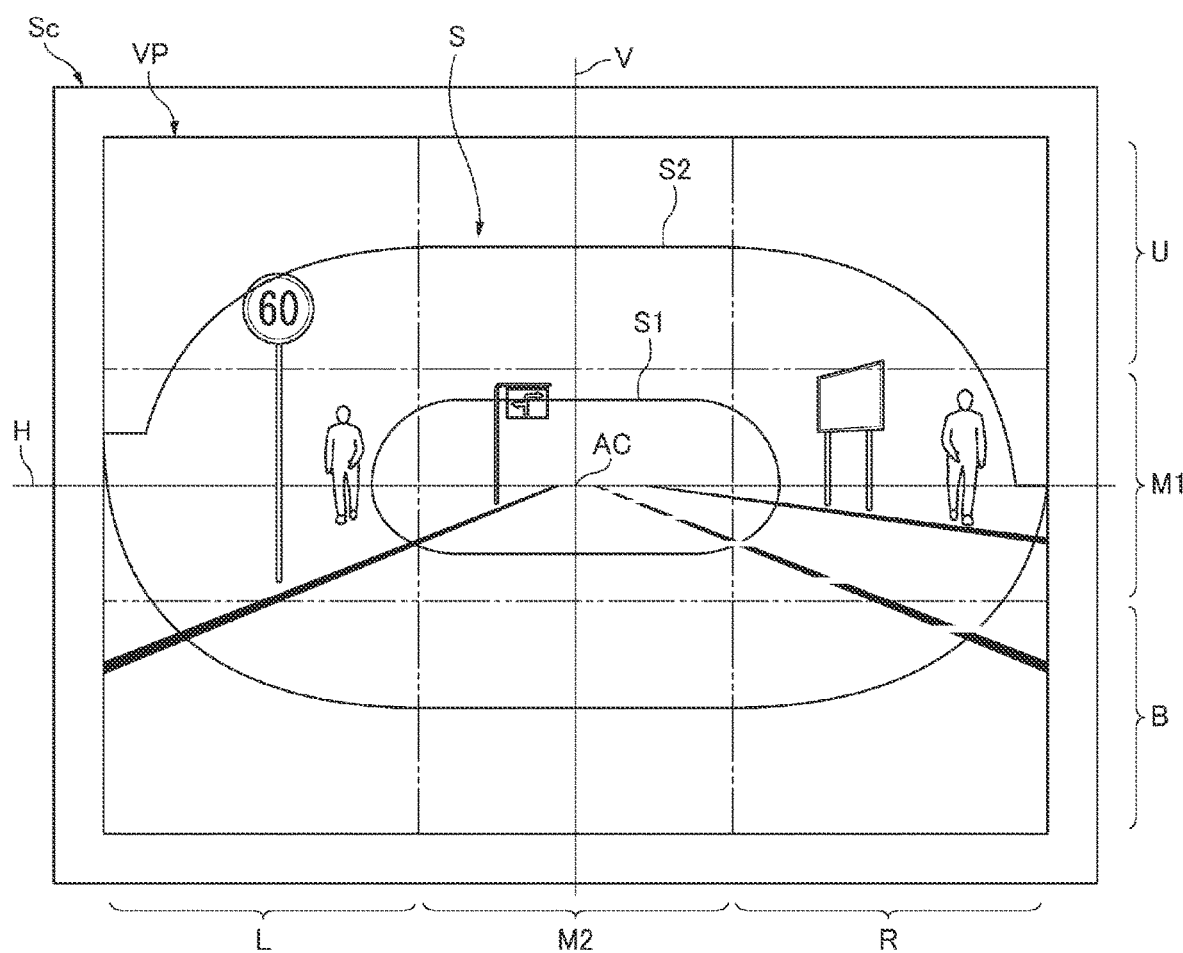
FIG. 14 shows a third light distribution pattern.

FIG. 12 to FIG. 14 are diagrams showing a state in front of the vehicle 201. Elements common to FIG. 12 to FIG. 14 will be described. FIG. 12 to FIG. 14 show a virtual vertical screen Sc provided 25 m in front of the lighting device 300 mounted on the right front portion of the vehicle 201. The lighting device 300 mounted on the right front portion of the vehicle 201 irradiates with light the virtual space VA that expands from a central position of a front surface of the lighting device 300 mounted on the right front portion of the vehicle 201. When the virtual space VA is projected onto the virtual vertical screen Sc, a virtual projection plane VP is formed on the virtual vertical screen Sc. Regarding a viewing method of FIG. 12 to FIG. 14, please refer to FIG. 6 and FIG. 7 of the first embodiment.

FIG. 12 shows the first light distribution pattern P suitable for an automatic driving mode. FIG. 13 shows the second light distribution pattern Q (so-called low-beam light distribution pattern) suitable for a manual driving mode. FIG. 14 shows the third light distribution pattern S (so-called high-beam light distribution pattern) which is suitable for the manual driving mode and is different from the second light distribution pattern Q.

FIG. 12 to FIG. 14 show respective light distribution patterns by using contour lines of light intensity. The contour lines are shown by equally dividing the light intensity in the virtual projection plane VP into three from the minimum value to the maximum value.

For example, in a case where the minimum value of the light intensity is 50,000 candelas and the maximum value is 110,000 candelas in the virtual projection plane VP, an area having the lowest light intensity is an area irradiated with 50,000 to 70,000 candelas, an area having middle light intensity is an area irradiated with 70,000 to 90,000 candelas, and an area having the highest light intensity is an area irradiated with 90,000 to 110,000 candelas. The light intensity is merely an example, and the present invention is not limited to the light intensity.

<First Light Distribution Pattern P>

FIG. 12 shows the first light distribution pattern P formed by the first lighting unit 310 on the virtual projection plane VP. The first light distribution pattern P is a light distribution pattern suitable for the automatic driving mode of the vehicle 201.

In the virtual projection plane VP of FIG. 12, an inner area surrounded by a line P1a and an inner area surrounded by a line P1b are areas having the highest light intensity. An area above the line P2a and an area below the line P2b are areas having the lowest light intensity. An area surrounded by the line P1a and the line P1b, the line P2a, and the line P2b is the area having middle light intensity.

As shown in FIG. 12, in the first light distribution pattern P, when the light intensity in the virtual projection plane VP is equally divided into three from the minimum value to the maximum value, an area having the highest light intensity is separated in the left-right direction by a line V extending in the vertical direction through a point where the reference line AC is projected. At least a part of the area having the highest light intensity is located in a first central portion M1 when the virtual projection plane VP is equally divided into three: the upper portion U, the first central portion M1, and the lower portion B in the up-down direction. In the illustrated example, the area having the highest light intensity is divided into two by the line V in the left-right direction.

<Second Light Distribution Pattern Q>

FIG. 13 shows the second light distribution pattern Q formed by the second lighting unit 320 on the virtual projection plane VP. The second light distribution pattern Q is a suitable light distribution pattern during the manual driving mode and when an oncoming vehicle passes by. The second light distribution pattern Q is also referred to as a low-beam light distribution pattern. As shown in FIG. 13, the second light distribution pattern Q includes a cutoff line CL in the vicinity of a line H.

In the virtual projection plane VP of FIG. 13, an inner area surrounded by a line Q1 is an area having the highest light intensity. An area below a line Q2 is an area having the lowest light intensity. An area surrounded by the line Q1 and the line Q2 is an area having middle light intensity.

As shown in FIG. 13, in the second light distribution pattern Q, when the light intensity in the virtual projection plane VP is equally divided into three from the minimum value to the maximum value, at least a part of the area having the highest light intensity is located at a second central portion M2 when the virtual projection plane VP is equally divided into three in the left-right direction: a left portion L, a second central portion M2, and a right portion R. The area having the highest light intensity in the second light distribution pattern Q shown in FIG. 13 is formed in the second central portion M2 in the left-right direction as a single area, unlike the area having the highest light intensity in the first light distribution pattern P shown in FIG. 12.

In the illustrated example, at least a part of the area having the highest light intensity is located in a first central portion M1 when the virtual projection plane VP is equally divided into three in the up-down direction: the upper portion U, the first central portion M1, and the lower portion B.

<Third Distribution Pattern S>

FIG. 14 shows the third light distribution pattern S formed by the second lighting unit 320 on the virtual projection plane VP. The third light distribution pattern S is a suitable light distribution pattern during the manual driving mode and when there is no oncoming vehicle. The third light distribution pattern S is also referred to as a high-beam light distribution pattern.

In the virtual projection plane VP of FIG. 14, an inner area surrounded by a line S1 is an area having the highest light intensity. An area outside a line S2 is an area having the lowest light intensity. An area surrounded by the line S1 and the line S2 is an area having middle light intensity.

As shown in FIG. 14, in the third light distribution pattern S, when the light intensity in the virtual projection plane VP is equally divided into three from the minimum value to the maximum value, at least a part of the area having the highest light intensity is located at a second central portion M2 when the virtual projection plane VP is equally divided into three in the left-right direction: a left portion L, a second central portion M2, and a right portion R. The area having the highest light intensity in the second light distribution pattern Q shown in FIG. 14 is formed in the second central portion M2 in the left-right direction as a single area, unlike the area having the highest light intensity in the first light distribution pattern P shown in FIG. 12.

In the illustrated example, at least a part of the area having the highest light intensity is located in a first central portion M1 when the virtual projection plane VP is equally divided into three in the up-down direction: the upper portion U, the first central portion M1, and the lower portion B.

Advantageous Effects of the Invention

The vehicle that can be automatically driven includes a case in which an automatic driving control unit of the vehicle controls driving (automatic driving mode) and a case where a driver performs driving (manual driving mode).

During the manual driving mode, the driver wants to obtain distant information in front of the vehicle. A distant object appears at the center of the virtual projection plane VP in the left-right direction. Therefore, the second light distribution pattern Q and the third light distribution pattern S are formed so that the area having the highest light intensity is formed in the second central portion of the virtual projection plane VP in the left-right direction.

However, during the automatic driving mode, a camera, not a human, obtains information in front of the vehicle. It is difficult for a camera to recognize a bright object and a dark object at the same time compared with human eyes. When the bright object is imaged, sensitivity of the camera is set low, or exposure time is set short. When the dark object is imaged, the sensitivity of the camera is set high, or the exposure time is set long. As described above, when the bright object is imaged and the dark object is imaged, the settings of an optimal camera are different. Therefore, it is difficult for the camera to recognize a bright object and a dark object at the same time as compared with human eyes.

During the automatic driving mode, it is necessary to acquire information such as a state of a road surface in front of the vehicle, presence or absence of a pedestrian walking on a road shoulder on a side of a driver's seat, information on a sign provided on the head of the driver, and presence or absence of a preceding vehicle or a facing vehicle located in front of the vehicle.

During the automatic driving mode including a fully automatic driving mode, an advanced driving support mode, and a driving support mode, it is assumed that these pieces of information are acquired by a camera. However, since an amount of light the camera receives from the object varies, halation occurs when the amount of light from the object is large, and the sensitivity is insufficient when the amount of light from the object is small.

Specifically, when the sensitivity of the camera is lowered or exposure time is shortened so that halation does not occur on a specific bright object, sensitivity to other dark objects is insufficient. On the other hand, when the sensitivity of the camera is raised or the exposure time is increased so as to compensate for insufficient sensitivity to a specific dark object, halation occurs on other bright objects.

In this way, it is difficult to prevent the occurrence of halation and insufficiency of sensitivity only by the camera. Therefore, the present inventor has studied a light distribution pattern suitable for the automatic driving mode instead of uniformly irradiating the front of the vehicle with light.

The present inventor has studied brightness of light from an object necessary for acquiring information.

Among the objects described above, bright reflected light is obtained when the objects are irradiated with light since the sign is coated with a paint having high reflectivity. Since the road surface in front of the vehicle is located near a headlight of a host vehicle, bright light is reflected. Therefore, when information on these signs and information on the road surface in front of the vehicle are acquired by the camera, bright light is incident on the camera.

On the other hand, since the pedestrian is hard to reflect light as compared with the signs or the like, dark light is incident on the camera when information of the pedestrian is to be acquired with the camera.

In order to accurately acquire information such as a sign or a road surface, when conditions such as exposure time and sensitivity of the camera suitable for brightness of light incident therefrom are set, the sensitivity to light from the pedestrian is easy to be insufficient. On the other hand, when conditions of the camera suitable for brightness of light incident from the pedestrian are set in order to accurately acquire information from the pedestrian, halation is easy to occur with light incident from the sign, the road surface, or the like. In this way, when light having uniform brightness is projected forward, a difference in brightness of reflected light is large, and it is difficult to obtain accurate information by the camera.

Therefore, the present inventor has studied in which area of the virtual projection plane VP of the virtual vertical screen the objects are easy to appear.

As shown in FIG. 12, the sign obtaining bright reflected light appears from the upper portion U to the first central portion M1 in the up-down direction and in the second central portion M2 in the left-right direction. The road surface in front of the vehicle obtaining bright reflected light appears from the first central portion M1 to the lower portion B in the up-down direction and in the second central portion M2 in the left-right direction. That is, the object obtaining bright reflected light appears from the upper portion U to the lower portion B in the up-down direction and in the second central portion M2 in the left-right direction.

The pedestrian having dark reflected light appears from the first central portion M1 to the lower portion B in the up-down direction and in areas of the left portion L and the right portion R and in the left-right direction.

In this way, the present inventor has found that an area in which the sign or the road surface obtaining bright reflected light appears is different from an area in which the pedestrian having dark reflected light appears.

Therefore, in the first light distribution pattern P of the lighting device 300 according to the present embodiment, an area having the highest light intensity is separated by the line V in the left-right direction, and at least a part of the area having the highest light intensity is located in the first central portion M1 in the up-down direction. Therefore, the pedestrian can be irradiated with bright light, and relatively bright reflected light is obtained from the pedestrian. On the other hand, since the sign or the road surface is irradiated with relatively dark light, the reflected light is also relatively dark. As a result, dispersion in the brightness of the reflected light from the object acquired by the camera can be reduced. The first light distribution pattern P can prevent occurrence of halation or occurrence of sensitivity insufficiency in the camera, and is suitable for a vehicle that can be automatically driven.

In this way, the lighting device 300 according to the present embodiment is configured to be able to form the first light distribution pattern P suitable for the automatic driving mode and the second light distribution pattern Q and the third light distribution pattern S suitable for the manual driving mode. Therefore, the lighting device 300 is suitable for mounting on the vehicle 201 capable of switching between the automatic driving mode and the manual driving mode.

In the above description, the lighting device 300 mounted on the right front portion of the vehicle has been described, but the lighting device 300 mounted on the left front portion of the vehicle may also be configured similarly such that in the virtual projection plane VP, when the light intensity is equally divided into three between the minimum value and the maximum value, the area having the highest light intensity is separated by the line V in the left-right direction, and at least a part of the area having the highest light intensity is located in the first central portion M1.

In the first light distribution pattern P of the lighting device according to the present embodiment, when the virtual projection plane VP of FIG. 12 is divided equally in the left-right direction into three: the left portion L, the second central portion M2, and the right portion R, at least parts of the two areas having the highest light intensity are located on the left portion L and right portion R, respectively.

It is highly possible that the pedestrians close to the host vehicle in the front-back direction is in the left portion L and the right portion R of the virtual projection plane VP. Therefore, according to the first light distribution pattern P, since the left portion L and the right portion R where the pedestrians are highly possible to be present are irradiated with bright light, the pedestrians are easily recognized by the camera.

As shown in FIG. 12, in the first light distribution pattern P, when the virtual projection plane VP are equally divided in the left-right direction into four: L1, L2, R2, and R1 from left in order, at least parts of the two areas having the highest light intensity are located in a left end area L1 and a right end area R1, respectively.

According to the lighting device 300 according to the present embodiment, the left end area L1 and the right end area R1 can be irradiated with bright light during the automatic driving mode. As described above, it is possible that the pedestrians close to the host vehicle are present in the left end and right end areas L1 and R1 on the virtual projection plane VP. Therefore, according to the lighting device 300 of the present embodiment, the pedestrians can be irradiated with bright light during the automatic driving mode, and it is easy for the camera to recognize the pedestrians close to the host vehicle.

As shown in FIG. 12, in the first light distribution pattern P, the two areas having the highest light intensity are formed in a band shape extending in the left-right direction. When the vehicle 201 advances, the pedestrian located near the center of the virtual projection plane VP appears to move leftward or rightward therefrom. Since the areas having the highest light intensity are formed in a band shape extending in the left-right direction, it is possible to continue irradiating the pedestrians continuously with bright light even if the vehicle 201 advances. This makes it easy for the camera to continue recognizing the pedestrians.

As shown in FIG. 12, in the first light distribution pattern P, the two areas having the highest light intensity have a diagonally right down shape from the center toward the right, and a diagonally left down shape from the center toward the left, respectively. As shown in FIG. 12, the road shoulder located on the left side of the host vehicle extends from the center of the virtual projection plane VP toward the lower left, and the road shoulder located on the right side of the host vehicle extends from the center to the lower right of the virtual projection plane VP. Since the pedestrians proceed along the road shoulder, it is possible to continue irradiating the pedestrians with bright light even if the pedestrians move. This makes it easy for the camera to recognize the pedestrians.

According to the lighting device 300 of the present embodiment, turning on of the first lighting unit 310 and turning on of the second lighting unit 320 are switched depending on output from the light distribution pattern changeover switch 218 (an example of an operation unit) that can be operated by the driver.

According to the lighting device 300 according to the present embodiment, since the driver can switch turning on of the first lighting unit 310 and turning on of the second lighting unit 320 according to personal intention, the driver is hard to feel uncomfortable compared with a case of automatically switching them.

Third Embodiment

Figure 15A:
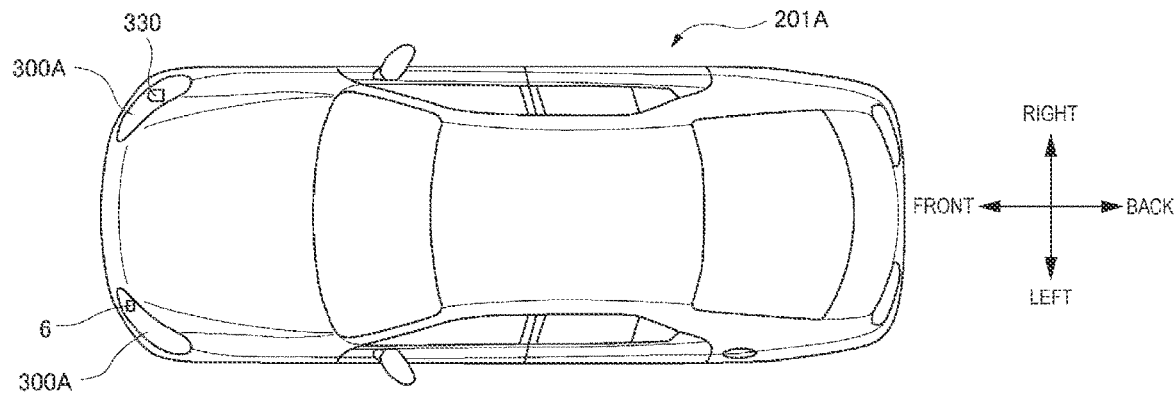
FIG. 15A is a top view of a vehicle mounted with a lighting device according to a second embodiment of the present invention.
Figure 15B:
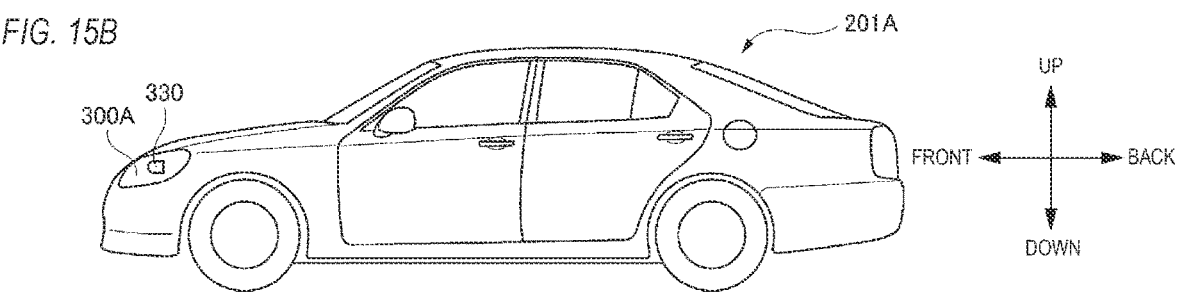
FIG. 15B is a side view of the vehicle shown in FIG. 15A.

Next, a lighting device 300A according to a third embodiment of the present invention will be described using FIG. 15A to FIG. 19. FIG. 15A is a top view of a vehicle 201A mounted with a lighting device 300A, and FIG. 15B is a left view of the vehicle 201A mounted with the lighting device 300A. Elements common to those of the second embodiment described above will not be described, and elements different from those of the second embodiment will be described below.

As shown in FIGS. 15A and 15B, the lighting device 300A includes a third lighting unit 330. The third lighting unit 330 is configured to be able to form the first light distribution pattern P to the third light distribution pattern S shown in FIG. 12 to FIG. 14.

Figure 16:
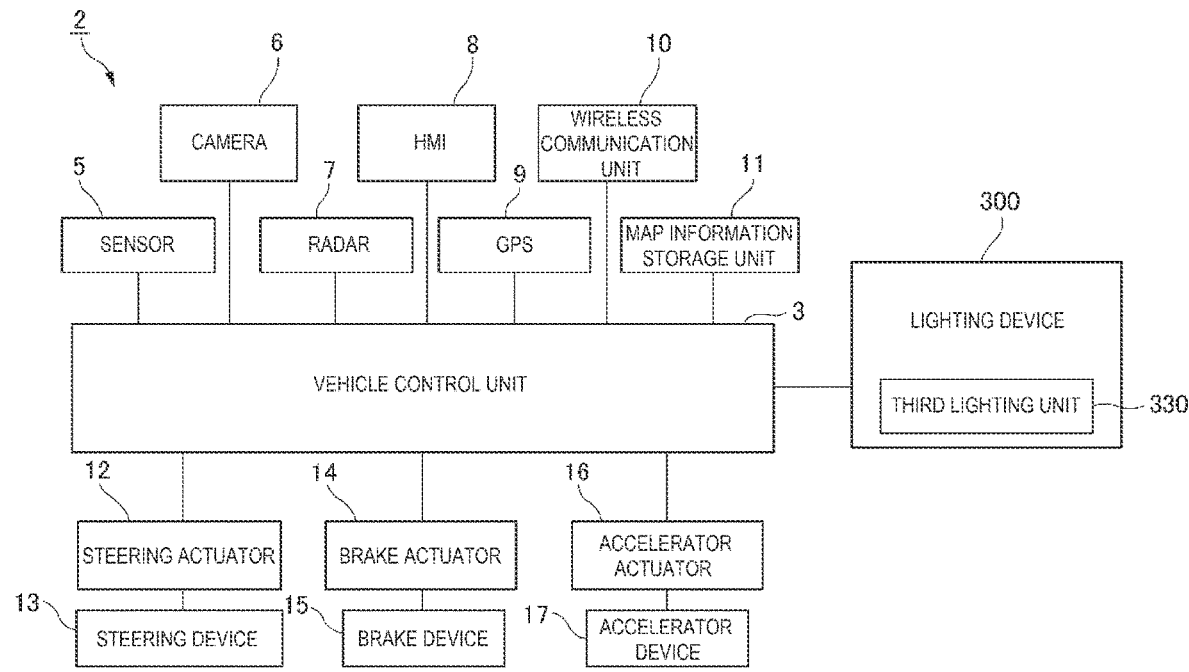
FIG. 16 is a block diagram of a vehicle system according to the second embodiment of the present invention.

FIG. 16 is a block diagram of a vehicle system of the vehicle 201A mounted with the lighting device 300A. As shown in FIG. 16, in the present embodiment, the light distribution pattern changeover switch 218 that can be operated by the driver described in the second embodiment is not provided. In the present embodiment, the vehicle control unit 3 is configured to control a switch of the first light distribution pattern P to the third light distribution pattern S depending on output of a driving mode changeover switch that switches a driving mode of the vehicle 201A included in a HMI 8.

Figure 17:
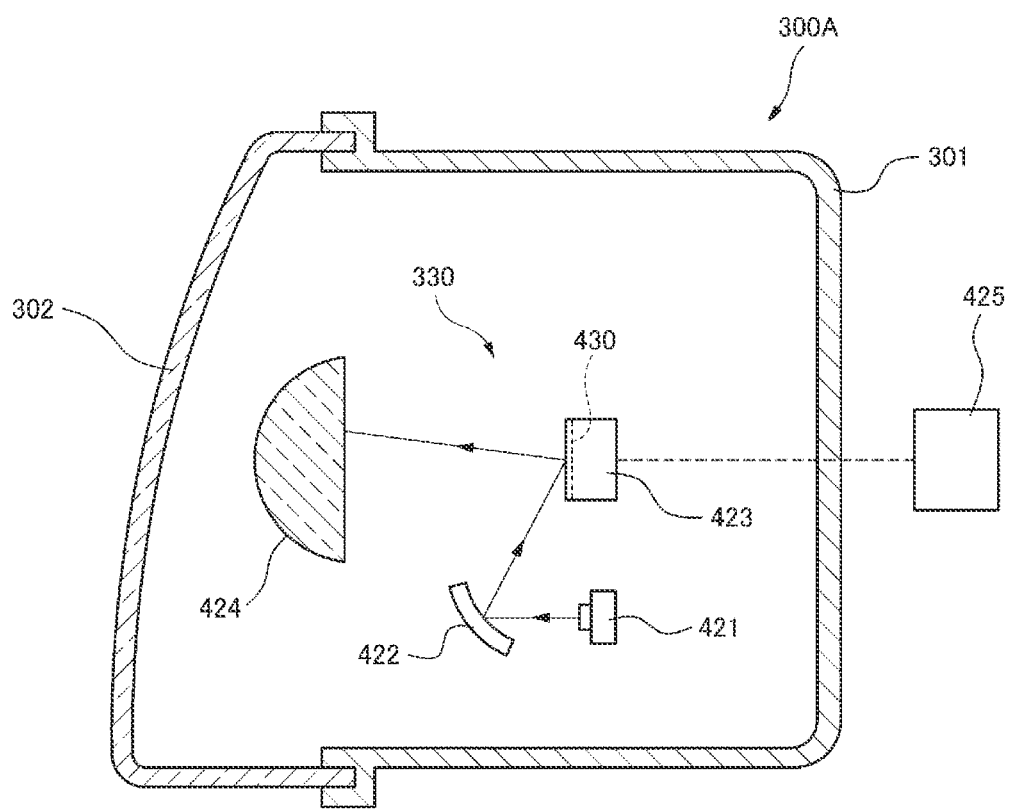
FIG. 17 is a cross-sectional view of the lighting device showing a third lighting unit.

FIG. 17 is a cross-sectional view of the lighting device 300A showing the third lighting unit 330. As shown in FIG. 17, the third lighting unit 330 includes a light source 421, a reflector 422, a Micro Electro Mechanical Systems (MEMS) mirror 423, a projection lens 424, and a mirror control unit 425. The reflector 422 reflects light emitted from the light source 421 toward the MEMS mirror 423. The projection lens 424 emits the reflected light from the MEMS mirror 423 toward the front of the vehicle 201A. A surface of the MEMS mirror 423 is enlarged by the projection lens 424 and projected to the front of the lighting device 300A.

The MEMS mirror 423 includes a plurality of minute mirror elements 430 on its surface. The mirror element 430 is configured to be able to change an angle by the mirror control unit 425. By controlling the angle of the mirror element 430, a state in which light is reflected to a desired direction (ON state) and a state in which light is not reflected (OFF state) can be switched by the mirror element 430. Output from the vehicle control unit 3 is input to the mirror control unit 425.

Figure 18:
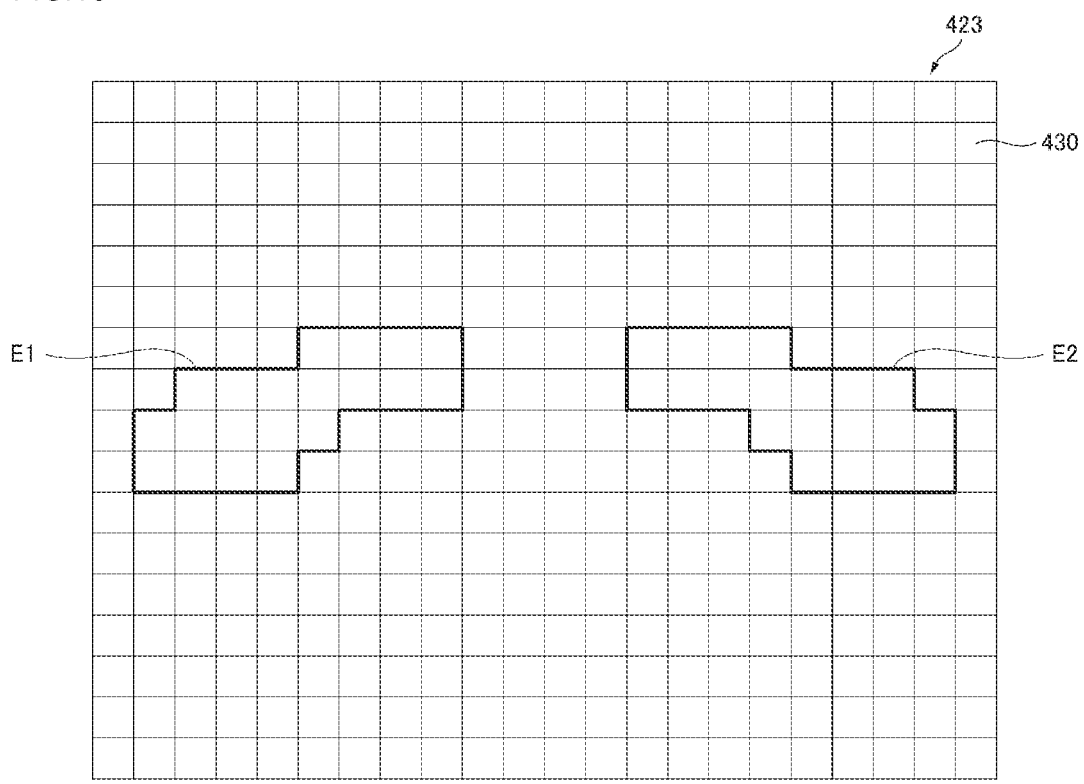
FIG. 18 shows a surface of a MEMS mirror when the first light distribution pattern is formed.
Figure 19:
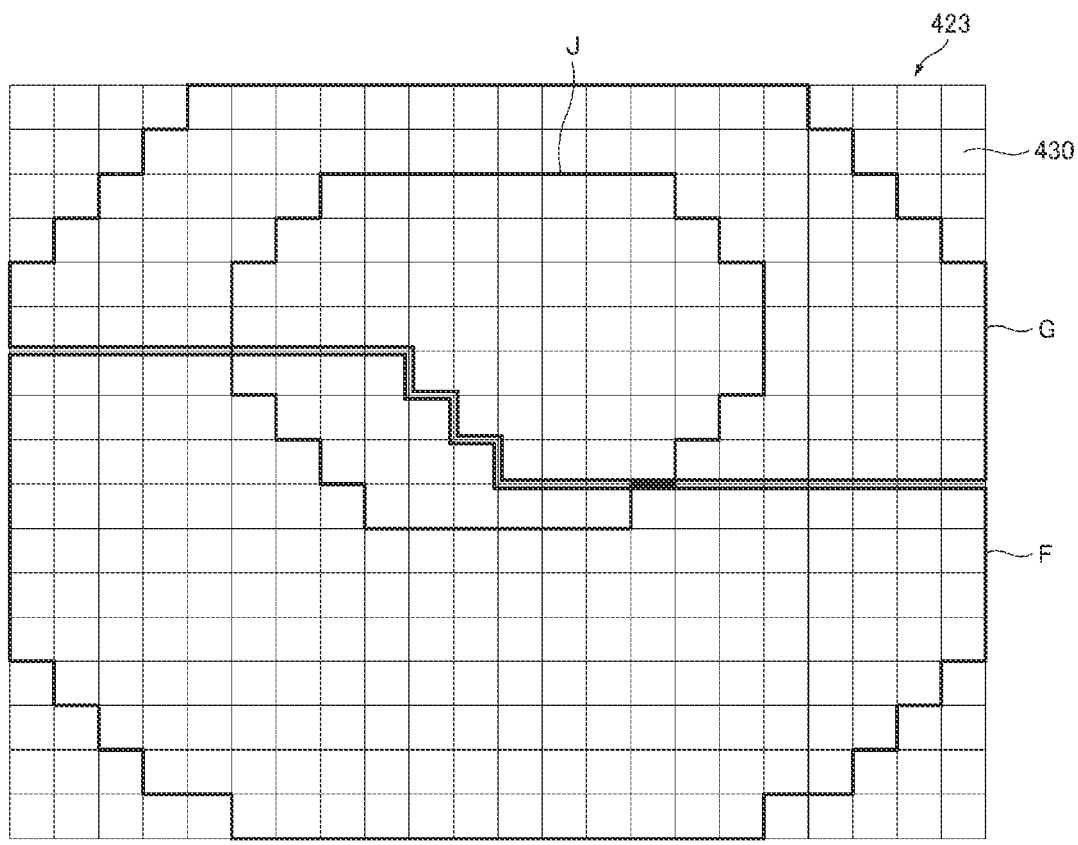
FIG. 19 shows a surface of the MEMS mirror when the second and third light distribution patterns are formed.

FIG. 18 and FIG. 19 schematically show a surface of the MEMS mirror 423 on which the mirror element 430 is provided. In FIG. 18 and FIG. 19, lattice-shaped elements schematically show the mirror element 430.

The third lighting unit 330 turns on the mirror elements 430 inside an area E1 and an area E2 shown in FIG. 18 and turns off the other mirror elements 430 to form the first light distribution pattern P.

The third lighting unit 330 turns on the mirror elements 430 inside an area F shown in FIG. 19 and turns off the other mirror elements 430 to form the second light distribution pattern Q. All of the mirror elements 430 inside an area J and inside the area F are turned on, and 80% of the mirror elements 430 which is both outside the area J and inside the area F are turned on. Accordingly, at least a part of the area having the highest light intensity can be formed on the second central portion M2 of the virtual projection plane VP.

The third lighting unit 330 turns on the mirror elements 430 inside the area F and the mirror elements 430 inside an area G shown in FIG. 19 and turns off the other mirror elements 430 to form the third light distribution pattern S. All of the mirror elements 430 which is both inside an area J and inside the areas F and G are turned on, and 80% of the mirror elements 430 which is both outside the area J and inside the areas F and G are turned on. Accordingly, at least a part of the area having the highest light intensity can be formed on the second central portion M2 of the virtual projection plane VP.

Although the mirror element 430 is depicted relatively large in FIG. 18 and FIG. 19, the mirror element 430 is actually smaller than the illustrated example. Therefore, actually, the first light distribution pattern shown in FIG. 12 can be formed with high accuracy, for example, by making the shape of the area E1 or the area E2 close to a shape of the area surrounded by the lines P1a and P1b shown in FIG. 12.

The lighting device 300A according to the present embodiment is configured to be able to form the first light distribution pattern P during the automatic driving mode and the second light distribution pattern Q during the manual driving mode. Accordingly, a light distribution pattern suitable for each can be formed during the automatic driving mode and the manual driving mode.

In the lighting device 300A of the present embodiment, turning on of the first lighting unit 310 and turning on of the second lighting unit 320 can be switched depending on a signal output from the vehicle control unit 3 that controls the vehicle 201A.

According to the lighting device 300A of the present embodiment, the automatic driving mode is switched to the manual driving mode or the manual driving mode is switched to the automatic driving mode, and the light distribution pattern can be switched. Operation of a driver is not necessary only for switching the light distribution pattern, and convenience of a user can be improved.

Although the embodiment of the present invention has been described above, it goes without saying that the technical scope of the present invention should not be interpreted as being limited by description of the present embodiment. It is to be understood by those skilled in the art that the present embodiment is merely an example and that various embodiments can be modified within the scope of the invention described in the claims. The technical scope of the present invention should be determined based on the scope of the invention described in the claims and an equivalent scope thereof.

For example, in the embodiment described above, an example in which the lighting device is mounted on the right front portion and the left front portion of the vehicle has been described, but the present invention is not limited thereto. Only one lighting device may be provided at the front portion of the vehicle, or three or more lighting devices may be provided at the front portion of the vehicle.

In the present embodiment, the driving mode of the vehicle has been described as including the fully automatic driving mode, the advanced driving support mode, the driving support mode, and the manual driving mode, but the driving mode of the vehicle should not be limited to these four modes. The driving mode of the vehicle may include at least one of these four modes. For example, the driving mode of the vehicle may include only the fully automatic driving mode.

Further, classification and a display form of the driving mode of the vehicle may be appropriately changed in accordance with regulations or rules related to automatic driving in each country. Similarly, definition of each of the "complete automatic driving mode", the "advanced driving support mode", and the "driving support mode" described in the description of the present embodiment is absolutely an example, and these definitions may be appropriately changed in accordance with regulations or rules related to automatic driving in each country.

In the embodiment described above, the lighting device mounted on a vehicle capable of automatic driving having a camera has been described, but the lighting device according to the present invention may be mounted on a vehicle having no camera. Even in this case, the lighting device according to the present invention is hard to cause halation on a camera of an oncoming vehicle.

The lighting device may include a single light source or may include a plurality of light sources. The light source can use a filament bulb, a discharge bulb, an LED element, an EL element, or the like. The lighting device may include a lens, a reflector, or a shade.

In the first embodiment described above, the lighting device may be configured to be able to form a low-beam light distribution pattern or a high-beam light distribution pattern during so-called manual driving in addition to forming the light distribution pattern shown in FIG. 6 and or FIG. 7 described above. In this case, the lighting device may be configured to form the light distribution pattern shown in FIG. 6 or FIG. 7 during the automatic driving.

Further, in the lighting device, the area having the highest light intensity in the virtual projection plane VP formed when the virtual space is projected onto the virtual vertical screen installed 25 m in front of the lighting device may be separated at the line V and divided into three or more in the left-right direction when the light intensity is equally divided into three from the minimum value to the maximum value.

Further, in the second embodiment described above, in the first light distribution pattern P, the area having the highest light intensity in the virtual projection plane VP formed when the virtual space is projected onto the virtual vertical screen installed 25 m in front of the lighting device may be separated at the line V and divided into three or more in the left-right direction when the light intensity is equally divided into three from the minimum value to the maximum value.

In the second embodiment described above, the lighting device may be configured to be able to emit only one of the second light distribution pattern and the third light distribution pattern. The light distribution pattern formed during the manual driving mode is not limited to the second light distribution pattern or the third light distribution pattern, and as long as the area having the highest light intensity is located in the second central portion M2 in the left-right direction of the virtual projection plane VP, a shape thereof is not asked for.

In the second embodiment described above, an example in which the lighting device 300 provided on the right front portion of the vehicle 201 includes the first lighting unit 310 and the second lighting unit 320 has been described, but the present invention is not limited thereto. For example, the lighting device may be configured to include the first lighting unit provided on the right front portion of the vehicle 201 and the second lighting unit provided on the left front portion of the vehicle 201.

The present application is based on Japanese Patent Application No. 2017-45949 filed on Mar. 10, 2017 and Japanese Patent Application No. 2017-45950 filed on Mar. 10, 2017, the contents of which are incorporated herein by reference.

INDUSTRIAL APPLICABILITY

According to the present invention, there is provided a lighting device capable of forming an optimal light distribution pattern in a situation in which traveling of a vehicle is automatically controlled.

REFERENCE SIGNS LIST 1 vehicle
2 vehicle system
3 vehicle control unit
5 sensor
6 camera
20 light source unit
21 light source
22 reflector
23 projection lens
24 base portion
25 lens holder
100 lighting device
101 housing
102 outer cover
201, 201A vehicle
218 light distribution pattern changeover switch
300, 300A lighting device
310 first lighting unit
320 second lighting unit
330 third lighting unit
S light chamber
Sc virtual vertical screen
VA virtual space
VP virtual projection plane
AC base line
P first light distribution pattern
Q second light distribution pattern
S third light distribution pattern

The invention claimed is:

1. A lighting device mounted on a vehicle capable of automatic driving that includes a camera imaging a front of the vehicle,
wherein the lighting device can irradiate light to virtual space that expands in a rectangular shape at 15° each of leftward and rightward and at 6° each of upward and downward with respect to a reference line extending to the front of the vehicle in a horizontal direction from a central position of the lighting device,
wherein a virtual vertical projection plane is formed when the virtual space is projected onto a virtual vertical screen installed 25 m in front of the lighting device,
wherein when light intensity on the virtual vertical projection plane is equally divided into three from a minimum value to a maximum value as highest light intensity, middle light intensity, and lowest light intensity, two areas having the highest light intensity in the virtual vertical projection plane are separated from each other in a left-right direction by an area having the middle light intensity at a line V extending in a vertical direction through a point on which the reference line is projected,
wherein at least a part of each of the two areas having the highest light intensity is located in a first central portion when the virtual vertical projection plane is equally divided into three: an upper portion, the first central portion, and a lower portion in an up-down direction, and
wherein when the virtual vertical projection plane is equally divided into three: a left portion, a second central portion, and a right portion in the left-right direction, at least parts of each of the two areas having the highest light intensity are located in the left portion and the right portion, respectively.

2. The lighting device according to claim 1,
wherein when the virtual vertical projection plane is equally divided into four in the left-right direction, at least parts of each of the two areas having the highest light intensity are located in a left end area and a right end area, respectively.

3. The lighting device according to claim 1,
wherein the two areas having the highest light intensity are formed in a band shape extending in the left-right direction.

4. The lighting device according to claim 3,
wherein the two areas having the highest light intensity have a diagonally right down shape from center to right, and a diagonally left down shape from center to left, respectively.

5. A lighting device mounted on a vehicle capable of switching between an automatic driving mode and a manual driving mode and irradiating light to a front of the vehicle,
wherein the lighting device is configured to be able to form a first light distribution pattern during the automatic driving mode and to be able to form a second light distribution pattern during the manual driving mode,
wherein the lighting device can irradiate light to virtual space that expands at 15° each of leftward and rightward and at 6° each of upward and downward with respect to a reference line extending to the front of the vehicle in a horizontal direction from a central position of the lighting device,
wherein in the first light distribution pattern, a virtual vertical projection plane is formed when the virtual space is projected onto a virtual vertical screen installed 25 m in front of the lighting device,
wherein in the first light distribution pattern, when light intensity on the virtual vertical projection plane is equally divided into three from a minimum value to a maximum value as highest light intensity, middle light intensity, and lowest light intensity, two areas having the highest light intensity in the virtual vertical projection plane are separated from each other in the left-right direction by an area having the middle light intensity at the line V extending in the vertical direction through a point on which the reference line is projected, wherein in the first light distribution pattern, at least a part of each of the two areas having the highest light intensity is located in a first central portion when the virtual vertical projection plane is equally divided into three: an upper portion, the first central portion, and a lower portion in the up-down direction, wherein in the first light distribution pattern, when the virtual vertical projection plane is equally divided into three: a left portion, a second central portion, and a right portion in the left-right direction, at least parts of each of the two areas having the highest light intensity are located in the left portion and the right portion, respectively, and wherein in the second light distribution pattern, at least a part of each of the two the areas having the highest light intensity is located in a second central portion when the virtual vertical projection plane is equally divided into three: the upper portion, the second central portion, and the lower portion in the up-down direction.

6. The lighting device according to claim 5, comprising:

a first lighting unit capable of forming the first light distribution pattern; and a second lighting unit capable of forming the second light distribution pattern, wherein turning on of the first lighting unit and turning on of the second lighting unit can be switched depending on a signal output from a vehicle control unit that controls the vehicle.

7. The lighting device according to claim 5, comprising:

a first lighting unit capable of forming the first light distribution pattern; and a second lighting unit capable of forming the second light distribution pattern, wherein turning on of the first lighting unit and turning on of the second lighting unit are switched depending on output from an operation unit that can be operated by a driver.

8. The lighting device according to claim 5, wherein when the virtual vertical projection plane is equally divided into four in the left-right direction, at least parts of each of the two areas having the highest light intensity are located in a left end area and a right end area, respectively.

9. The lighting device according to claim 5, wherein in the first light distribution pattern, the two areas having the highest light intensity are formed in a band shape extending in the left-right direction.

10. The lighting device according to claim 9, wherein in the first light distribution pattern, the two areas having the highest light intensity have a diagonally right down shape from center to right, and a diagonally left down shape from center to left, respectively.

* * * * *